United States Patent
Bisiules

(10) Patent No.: US 11,411,301 B2
(45) Date of Patent: *Aug. 9, 2022

(54) COMPACT MULTIBAND FEED FOR SMALL CELL BASE STATION ANTENNAS

(71) Applicant: CommScope Technologies LLC, Hickory, NC (US)

(72) Inventor: Peter J. Bisiules, LaGrange Park, IL (US)

(73) Assignee: CommScope Technologies LLC, Hickory, NC (US)

( * ) Notice: Subject to any disclaimer, the term of this patent is extended or adjusted under 35 U.S.C. 154(b) by 339 days.

This patent is subject to a terminal disclaimer.

(21) Appl. No.: 16/877,745

(22) Filed: May 19, 2020

(65) Prior Publication Data

US 2020/0280124 A1    Sep. 3, 2020

Related U.S. Application Data

(63) Continuation of application No. 16/228,930, filed on Dec. 21, 2018, now Pat. No. 10,700,420.

(Continued)

(51) Int. Cl.
    *H01Q 1/24* (2006.01)
    *H04B 1/00* (2006.01)
    (Continued)

(52) U.S. Cl.
    CPC ............. *H01Q 1/246* (2013.01); *H01Q 5/314* (2015.01); *H01Q 21/0006* (2013.01);
    (Continued)

(58) Field of Classification Search
    CPC . H01Q 3/30; H01P 1/184; H03H 7/18; H04B 1/0057
    See application file for complete search history.

(56) References Cited

U.S. PATENT DOCUMENTS

| 5,982,337 A | 11/1999 | Newman et al. |
| 9,373,885 B2 | 6/2016 | Huerta et al. |

(Continued)

FOREIGN PATENT DOCUMENTS

| CN | 105659434 A | 6/2016 |
| CN | 106716714 A | 5/2017 |
| EP | 1071160 A2 | 1/2001 |
| EP | 1642357 A1 | 4/2006 |

OTHER PUBLICATIONS

Chinese Office Action corresponding to CN 201880090798.X; dated Aug. 24, 2021 (27 pages, including English translation).

(Continued)

*Primary Examiner* — Ayaz R Sheikh
*Assistant Examiner* — Debebe A Asefa
(74) *Attorney, Agent, or Firm* — Myers Bigel, P.A.

(57) ABSTRACT

Base station antennas are provided that include a plurality of linear arrays of radiating elements, a feed network having a first RF input that is configured to receive a first RF signal that is within a first frequency band and a second RF input that is configured to receive a second RF signal that is within a second frequency band that is different from the first frequency band. The first RF input is coupled to all of the linear arrays while the second RF input is only coupled to a first subset of the linear arrays that includes less than all of the linear arrays.

19 Claims, 13 Drawing Sheets

Related U.S. Application Data

(60) Provisional application No. 62/638,325, filed on Mar. 5, 2018.

(51) Int. Cl.
  *H01Q 21/00* (2006.01)
  *H01Q 5/314* (2015.01)
  *H01Q 25/00* (2006.01)
  *H01Q 23/00* (2006.01)
  *H01Q 21/29* (2006.01)
  *H01Q 21/08* (2006.01)

(52) U.S. Cl.
  CPC ............ *H01Q 21/08* (2013.01); *H01Q 21/29* (2013.01); *H01Q 23/00* (2013.01); *H01Q 25/005* (2013.01); *H04B 1/0057* (2013.01)

(56) References Cited

U.S. PATENT DOCUMENTS

| | | |
|---|---|---|
| 9,537,214 B2 | 1/2017 | Corman et al. |
| 2007/0205955 A1 | 9/2007 | Korisch et al. |
| 2011/0134008 A1 | 6/2011 | Schadler |
| 2014/0242930 A1 | 8/2014 | Barker et al. |
| 2015/0244072 A1 | 8/2015 | Harel |
| 2015/0318876 A1 | 11/2015 | Resnati et al. |
| 2015/0357721 A1 | 12/2015 | Zimmerman et al. |
| 2016/0240922 A1 | 8/2016 | Veihl et al. |

OTHER PUBLICATIONS

International Preliminary Report on Patentability corresponding to International Patent Application No. PCT/US2018/067009 (12 pages) (dated Sep. 17, 2020).

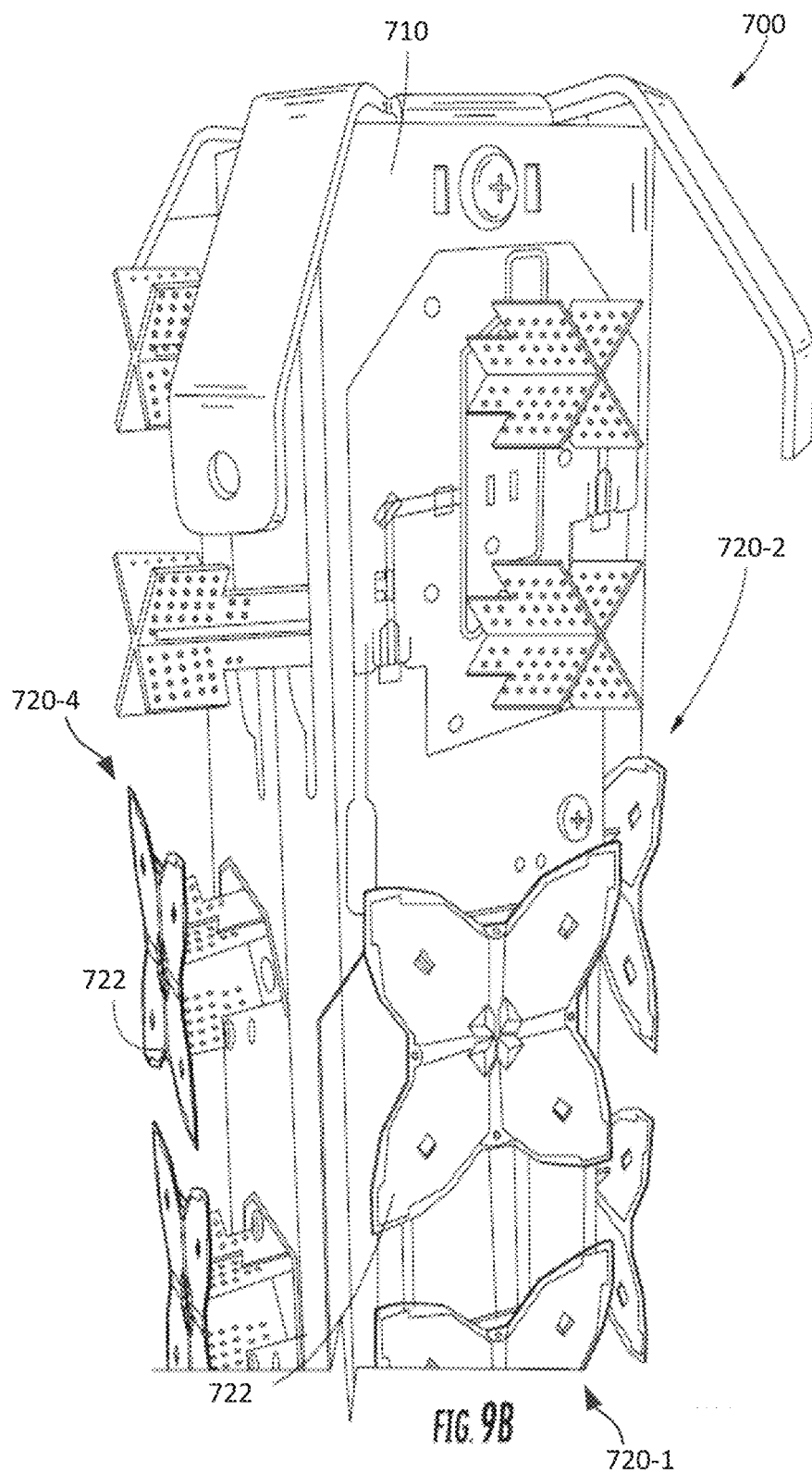

COMPACT MULTIBAND FEED FOR SMALL CELL BASE STATION ANTENNAS

CROSS-REFERENCE TO RELATED APPLICATION

The present application is a continuation under 35 U.S.C. § 120 of U.S. patent application Ser. No. 16/228,930, filed Dec. 21, 2018, which in turn claims priority under 35 U.S.C. § 119 to U.S. Provisional Patent Application Ser. No. 62/638,325 filed Mar. 5, 2018, the entire contents of which are incorporated herein by reference.

FIELD

The present invention relates to cellular communications systems and, more particularly, to base station antennas for small cell cellular base stations.

BACKGROUND

Cellular communications systems are well known in the art. In a typical cellular communications system, a geographic area is divided into a series of regions that are referred to as "cells," and each cell is served by a base station. Typically, a cell may serve users who are within a distance of, for example, 1-20 kilometers from the base station, although smaller cells are typically used in urban areas to increase capacity. The base station may include baseband equipment, radios and antennas that are configured to provide two-way radio frequency ("RF") communications with fixed and mobile subscribers ("users") that are positioned throughout the cell. In many cases, the cell may be divided into a plurality of "sectors," and separate antennas provide coverage to each of the sectors. The antennas are often mounted on a tower or other raised structure, with the radiation beam ("antenna beam") that is generated by each antenna directed outwardly to serve a respective sector. Typically, a base station antenna includes one or more phase-controlled arrays of radiating elements, with the radiating elements arranged in one or more vertical columns when the antenna is mounted for use. Herein, "vertical" refers to a direction that is perpendicular relative to the plane defined by the horizon.

In order to increase capacity, cellular operators have, in recent years, been deploying so-called "small cell" cellular base stations. A small cell base station refers to a low-power base station that may operate in the licensed and/or unlicensed frequency spectrum that has a much smaller range than a typical "macro cell" base station. A small cell base station may be designed to serve users who are within a small geographic region (e.g., within tens or hundreds of meters of the small cell base station). Small cells may be used, for example, to provide cellular coverage to high traffic areas within a macro cell, which allows the macro cell base station to offload much or all of the traffic in the vicinity of the small cell base station. Small cells may be particularly effective in Long Term Evolution ("LTE") cellular networks in efficiently using the available frequency spectrum to maximize network capacity at a reasonable cost. Small cell base stations typically employ an antenna that provides full 360 degree coverage in the azimuth plane and a suitable beamwidth in the elevation plane to cover the designed area of the small cell. The small cell antenna will be designed to have a small downtilt in the elevation plane to reduce spill-over of the antenna beam of the small cell antenna into regions that are outside the small cell and also for reducing interference between the small cell and the overlaid macro cell. The small cell base stations may operate in a single frequency band or may instead be a "multiband" base station that supports communications in multiple of the cellular frequency bands.

FIG. 1A is a schematic diagram of a conventional small cell base station 10. As shown in FIG. 1A, the base station 10 includes an antenna 20 that may be mounted on a raised structure 30. In the depicted embodiment, the structure 30 is a small antenna tower, but it will be appreciated that a wide variety of mounting locations may be used including, for example, utility poles, buildings, water towers and the like. The antenna 20 may be designed to have an omnidirectional antenna pattern in the azimuth plane for at least some of the frequency bands supported by the base station antenna, meaning that at least one antenna beam generated by the antenna 20 may extend through a full 360 degree circle in the azimuth plane.

As is further shown in FIG. 1A, the small cell base station 10 also includes base station equipment such as baseband units 40 and radios 42. A single baseband unit 40 and a single radio 42 are shown in FIG. 1A to simplify the drawing, but it will be appreciated that more than one baseband unit 40 and/or radio 42 may be provided. Additionally, while the radio 42 is shown as being co-located with the baseband equipment 40 at the bottom of the antenna tower 30, it will be appreciated that in other cases the radio 42 may be a remote radio head that is mounted on the antenna tower 30 adjacent the antenna 20. The baseband unit 40 may receive data from another source such as, for example, a backhaul network (not shown) and may process this data and provide a data stream to the radio 42. The radio 42 may generate RF signals that include the data encoded therein and may amplify and deliver these RF signals to the antenna 20 for transmission via a cabling connection 44. It will also be appreciated that the base station 10 of FIG. 1A will typically include various other equipment (not shown) such as, for example, a power supply, back-up batteries, a power bus, Antenna Interface Signal Group ("AISG") controllers and the like.

FIG. 1B is a composite of several views of an antenna beam 60 having an omnidirectional pattern in the azimuth plane that may be generated by the antenna 20. In particular, FIG. 1B includes a perspective three-dimensional view of the antenna beam 60 (labelled "3D pattern") as well as plots of the azimuth and elevation patterns thereof. The azimuth pattern is generated by taking a horizontal cross-section through the middle of the three dimensional antenna beam 60, and the elevation pattern is generated by taking a vertical cross-section through the middle of the three dimensional beam 60. The three-dimensional pattern in FIG. 1B illustrates the general shape of the generated antenna beam in three dimensions. As can be seen, the antenna beam 60 extends through a full 360 degrees in the azimuth plane, and the antenna beam 60 may have a nearly constant gain in all directions in the azimuth plane. In the elevation plane, the antenna beam 60 has a high gain at elevation angles close to the horizon (e.g., elevation angles between −10° and 10°), but the gain drops off dramatically both above and below the horizon. The antenna beam 60 thus is omnidirectional in the azimuth plane and directional in the elevation plane.

SUMMARY

Pursuant to embodiments of the present invention, multiband base station antennas are provided that include first through fourth linear arrays of radiating elements and a feed network. The feed network includes first through third RF inputs that are configured to receive first through third RF signals, where the first RF signal is in a first frequency band and the second and third RF signals are in a second frequency band that is different from the first frequency band. The feed network has first through fourth RF outputs that are coupled to the radiating elements of the respective first through fourth linear arrays. The feed network couples the first RF input to each of the first through fourth linear arrays and couples the second RF input to only the first and third linear arrays.

In some embodiments, the feed network may include a first diplexer that has a first input that is coupled to the first RF input and a second input that is coupled to the second RF input and a second diplexer that has a first input that is coupled to the first RF input and a second input that is coupled to the third RF input. In such embodiments, the feed network may further include a first power coupler that is that is electrically coupled between the first RF input and the first and second diplexers, a second power coupler that is electrically coupled between the first diplexer and the first and third linear arrays, and/or a third power coupler that is electrically coupled between the second diplexer and the second and fourth linear arrays.

In some embodiments, the feed network may include an attenuator that is coupled between the first RF input and the first through fourth linear arrays.

In some embodiments, the first through fourth linear arrays of radiating elements may be mounted in front of respective first through fourth backplanes, and the backplanes may be arranged such that the first linear array of radiating elements is positioned generally opposite the third linear array of radiating elements and the second linear array of radiating elements is positioned generally opposite the fourth linear array of radiating elements. In such embodiments, the first and third linear arrays of radiating elements may be configured to generate a first antenna beam that has a peanut-shaped cross-section in the azimuth plane, and the second and fourth linear arrays of radiating elements may be configured to generate a second antenna beam that has a peanut-shaped cross-section in the azimuth plane.

In some embodiments, the multiband base station antenna may further include a fifth linear array of radiating elements that is mounted in front of the first backplane and a sixth linear array of radiating elements that is mounted in front of the third backplane. The fifth and sixth linear arrays of radiating elements may be configured to transmit and receive RF signals in a third frequency band that is different than the first and second frequency bands.

In some embodiments, the feed network may be further configured to couple the third RF input to only the second and fourth linear arrays.

In some embodiments, the feed network may include fewer RF inputs than RF outputs.

Pursuant to further embodiments of the present invention, base station antennas are provided that include a plurality of linear arrays of radiating elements and a feed network having a first RF input that is configured to receive a first RF signal that is within a first frequency band and a second RF input that is configured to receive a second RF signal that is within a second frequency band that is different from the first frequency band. The first RF input is coupled to all of the linear arrays and the second RF input is only coupled to a first subset of the linear arrays that includes less than all of the linear arrays.

In some embodiments, the feed network may further include a third RF input that is configured to receive a third RF signal that is within the second frequency band. In such embodiments, the third RF input may only be coupled to a second subset of the linear arrays that includes less than all of the linear arrays. In such embodiments, the first subset of the linear arrays may not include any of the linear arrays that are in the second subset of the linear arrays.

In some embodiments, the first RF input and the second RF input may be two of a plurality of RF inputs of the feed network, and the feed network may include a plurality of RF outputs that are coupled to respective ones of the linear arrays, where the number of RF outputs is greater than the number of RF inputs.

In some embodiments, the plurality of linear arrays may include first through fourth linear arrays that are mounted to extend forwardly from first through fourth backplanes of a tubular reflector having a rectangular cross-section. In such embodiments, the second RF input may be coupled to only the first and third linear arrays and the third RF input may be coupled to only the second and fourth linear arrays. The first and third linear arrays may point in opposite directions and the second and fourth linear arrays may point in opposite directions. Moreover, the first and third linear arrays may be configured to generate a first antenna beam that has a first peanut-shaped cross-section in an azimuth plane and the second and fourth linear arrays may be configured to generate a second antenna beam that has a second peanut-shaped cross-section in the azimuth plane. The longitudinal axis of the first antenna beam in the azimuth plane may be rotated approximately ninety degrees from a longitudinal axis of the second antenna beam in the azimuth plane.

In some embodiments, the feed network may feed RF signals from the second RF input to the radiating elements of the first linear array of radiating elements out-of-phase with respect to the radiating elements of the third linear array of radiating elements.

In some embodiments, the feed network may feed RF signals from the second RF input to the radiating elements of the first linear array of radiating elements at a phase that is approximately 180 degrees out-of-phase with respect to the radiating elements of the third linear array of radiating elements. In other embodiments, phase differences between 0 degrees and 180 degrees could alternatively be used.

In some embodiments, the feed network may further includes a first diplexer that has a first input that is coupled to the first RF input and a second input that is coupled to the second RF input and a second diplexer that has a first input that is coupled to the first RF input and a second input that is coupled to the third RF input.

In such embodiments, the feed network may also include a first power coupler that is electrically coupled between the first RF input and the first and second diplexers, a second power coupler that is electrically coupled between the first diplexer and first and third of the linear arrays, and/or a third power coupler that is electrically coupled between the second diplexer and second and fourth of the linear arrays.

Pursuant to additional embodiments of the present invention, multiband base station antennas are provided that include a plurality of linear arrays of radiating elements and a feed network having a plurality of RF inputs and a plurality of RF outputs, where the number of RF outputs is greater than the number of RF inputs and where a first of the RF inputs is coupled to all of the linear arrays and a second of the RF inputs is only coupled to a subset of the linear arrays.

In some embodiments, the first of the RF inputs may be configured to receive an RF signal that is within a first frequency band and the second of the RF inputs may be configured to receive an RF signal that is within a second frequency band that is different from the first frequency band, and a third of the RF inputs may be configured to receive an RF signal that is within the second frequency band.

In some embodiments, the linear arrays may include first and third opposed linear arrays and second and fourth opposed linear arrays, where the second of the RF inputs is coupled to only the first and third linear arrays and the third of the RF inputs is coupled to only the second and fourth linear arrays.

BRIEF DESCRIPTION OF THE DRAWINGS

FIGS. 9A and 9B are schematic plan view and a partial perspective view of a base station antenna according to further embodiments of the present invention with the radome thereof removed.

DETAILED DESCRIPTION

Figure 1A:
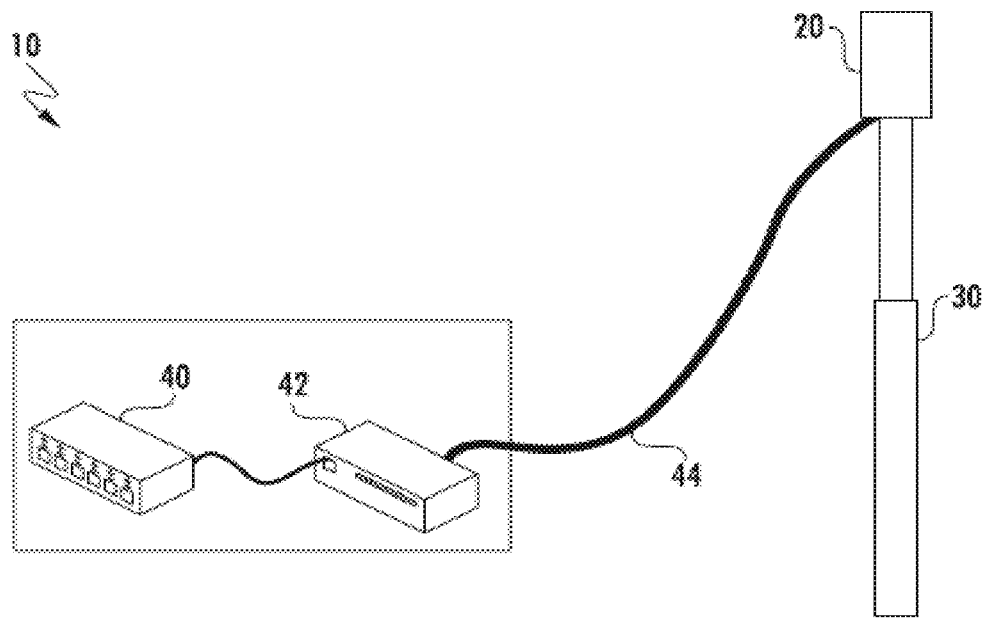
FIG. 1A is a simplified schematic diagram illustrating a conventional small cell cellular base station.
Figure 1B:
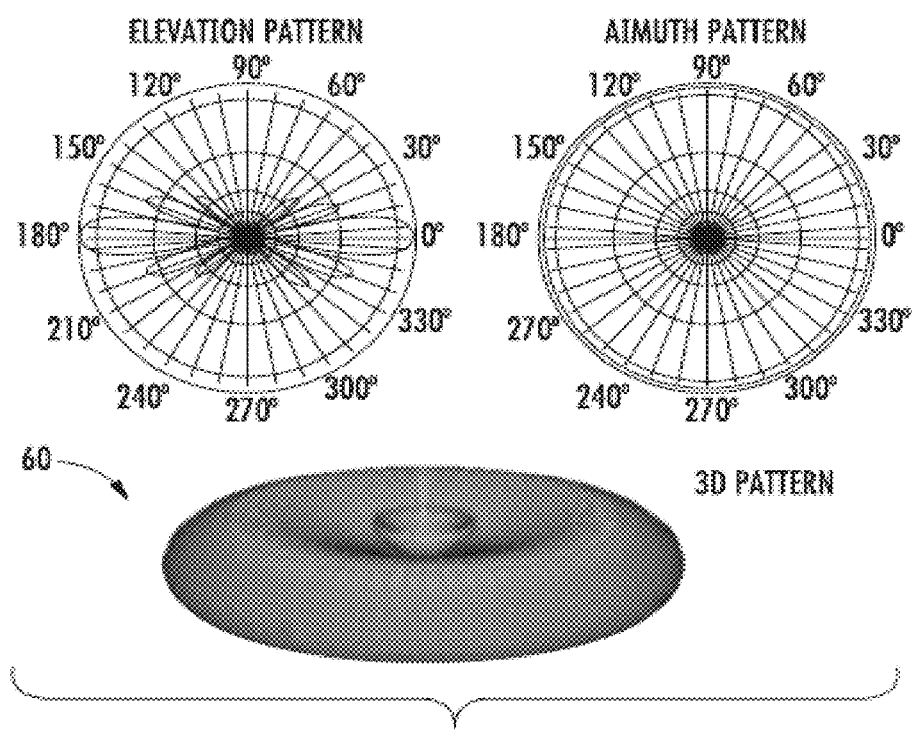
FIG. 1B provides several views of an antenna beam that may be generated by the antenna of the conventional small cell base station of FIG. 1A.

As capacity requirements continue to increase, cellular operators are deploying base stations that operate in LTE Licensed Assisted Access (LTE-LAA) mode. Under LTE-LAA, the various unlicensed frequency bands may be used in combination with licensed spectrum to deliver higher data rates for subscribers. The LTE-LAA functionality is typically implemented with indoor and outdoor small cell base stations. By distributing traffic between the licensed and unlicensed bands, LTE-LAA frees up capacity in the licensed spectrum, benefiting users on those frequency bands, as well as providing high data rate communications to other users using unlicensed spectrum.

Two frequency bands which may be used for LTE-LAA are the 3.4-3.8 GHz frequency band and the 5.15-5.925 GHz frequency band, or selected portions thereof. Herein, the 3.4-3.8 GHz frequency band will be referred to as the "3.5 GHz" frequency band, and the 5.15-5.925 GHz frequency band will be referred to as the "5 GHz" frequency band. LTE-LAA may be implemented by adding a 3.5 GHz radio and/or a 5 GHz radio to a conventional base station and by adding one or more linear arrays of GHz radiating elements that operate in one or both of the 3.5 GHz and 5 GHz frequency bands to the conventional base station antenna. In other cases, however, the base station antenna may be designed to only operate in the 3.5 GHz and 5 GHz frequency bands or selected portions thereof.

Base station antenna have been proposed which have linear arrays of radiating elements mounted on a tubular reflector assembly. For example, U.S. Provisional Patent Application Ser. No. 62/486,897, filed Apr. 18, 2017 ("the '897 application"), and U.S. Provisional Patent Application Ser. No. 62/565,284, filed Sep. 29, 2017 ("the '284 application"), the entire content of each of which is incorporated herein by reference, disclose various small cell base station antennas that have tubular reflector assemblies with one or more linear arrays of radiating elements mounted on each of the four sides of the tubular reflector assembly.

Pursuant to embodiments of the present invention, feed networks for small cell base station antenna (and related base station antennas) are provided. The feed networks may be suitable for use in the small cell base station antenna disclosed in the above-referenced '897 and '284 applications. In some embodiments, the small cell base station antenna may include four linear arrays of wideband radiating elements that are mounted on the four main faces of a rectangular tubular reflector assembly. The wideband radiating elements may transmit and receive signals in first and second frequency bands. The first and second frequency bands may be widely separated from each other, such as the 3.5 GHz and 5 GHz frequency bands.

The feed networks according to embodiments of the present invention may be used to distribute the 3.5 GHz and 5 GHz signals differently to the linear arrays of wideband radiating elements. In particular, first through fourth 3.5 GHz signals may be provided from a 3.5 GHz radio. The first and third 3.5 GHz signals may have orthogonal polarizations. The first 3.5 GHz signal may be fed to both the first and third linear arrays of the small cell antenna, which are mounted on opposed main faces of the rectangular tubular reflector assembly, to form a first antenna beam that has a generally peanut-shaped cross-section in the azimuth plane. The third 3.5 GHz signal may also be fed to both the first and third linear arrays to generate a third antenna beam that also has a generally peanut-shaped cross-section in the azimuth plane. The second and fourth 3.5 GHz signals may likewise have orthogonal polarizations. The second and fourth linear arrays of the small cell antenna may also be mounted on opposed main faces of the rectangular tubular reflector assembly, and may point in directions that are offset by about 90° from the respective pointing directions of the first and third linear arrays. The second 3.5 GHz signal may be fed to both the second and fourth linear arrays to generate a second antenna beam that has a generally peanut-shaped cross-section in the azimuth plane, and the fourth 3.5 GHz signal may also be fed to both the second and fourth linear arrays to generate a fourth antenna beam that has a generally peanut-shaped cross-section in the azimuth plane. The longitudinal axis of the second and fourth 3.5 GHz antenna beams are rotated 90° with respect to the first and third 3.5 GHz antenna beams. Since the small cell antenna may generate four generally independent antenna beams (since the antenna beams are generated via linear arrays having spatial and polarization diversity), the antenna may support 4×MIMO transmissions at 3.5 GHz.

In contrast, only first and second 5 GHz signals are provided from a 5 GHz radio to the small cell antenna, each of which has a different polarization. Each 5 GHz signal is commonly fed to all four linear arrays of the small cell antenna. Thus, the antenna may generate two 5 GHz antenna beams, one at each orthogonal polarization. Since the small cell antenna may generate two generally independent 5 GHz antenna beams, the antenna may support 2×MIMO transmissions at 5 GHz.

According to some embodiments, base station antennas are provided that include a plurality of linear arrays of radiating elements, a feed network having a first RF input that is configured to receive a first RF signal that is within a first frequency band and a second RF input that is configured to receive a second RF signal that is within a second frequency band that is different from the first frequency band. The first RF input is coupled to all of the linear arrays while the second RF input is only coupled to a first subset of the linear arrays that includes less than all of the linear arrays.

The feed networks for these base station antennas may also include a third RF input that is configured to receive a third RF signal that is within the second frequency band that is only coupled to a second subset of the linear arrays that includes less than all of the linear arrays. The first subset of the linear arrays may not include any of the linear arrays that are in the second subset of the linear arrays. In these feed networks, the number of RF outputs may be greater than the number of RF inputs.

In some embodiments, the feed network may be used to feed four linear arrays of wideband radiating elements that operate in first and second frequency bands such as, for example, the 3.5 GHz and 5 GHz frequency bands. In such embodiments, the feed network may include a first RF input for RF signals in the first frequency band and second and third RF inputs for RF signals in the second frequency band. The feed network may include four outputs, each of which is coupled to a respective one of the linear arrays. The feed network couples the first RF input to each of the four linear arrays, couples the second RF input to only the first and third linear arrays, and couples the third RF input to only the second and fourth linear arrays.

In such embodiments the feed network may include a first diplexer that has a first input that is coupled to the first RF input and a second input that is coupled to the second RF input, and a second diplexer that has a first input that is coupled to the first RF input and a second input that is coupled to the third RF input. The feed network may also include a power coupler that is electrically coupled between the first RF input and the first and second diplexers, a second power coupler that is electrically coupled between the first diplexer and the first and third linear arrays and a third power coupler that is electrically coupled between the second diplexer and the second and fourth linear arrays. Herein the term "power coupler" is used interchangeably with the terms "power combiner" and "power divider" to broadly encompass any power splitter/combiner structures that may combine signals passing through the device in a first direction and/or which may split signals passing through the device in a second direction.

Example embodiments of the invention will now be discussed in more detail with reference to the attached drawings.

Figure 2A:
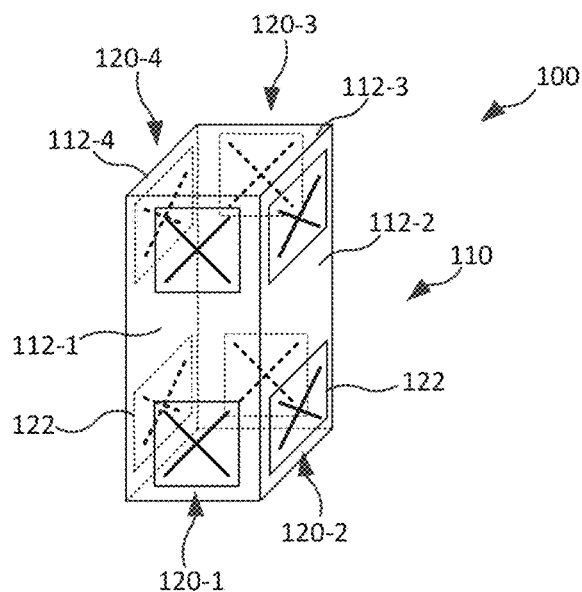
FIG. 2A is a highly simplified schematic perspective diagram illustrating the reflector assembly and radiating elements of a lensed base station according to embodiments of the present invention.
Figure 2B:
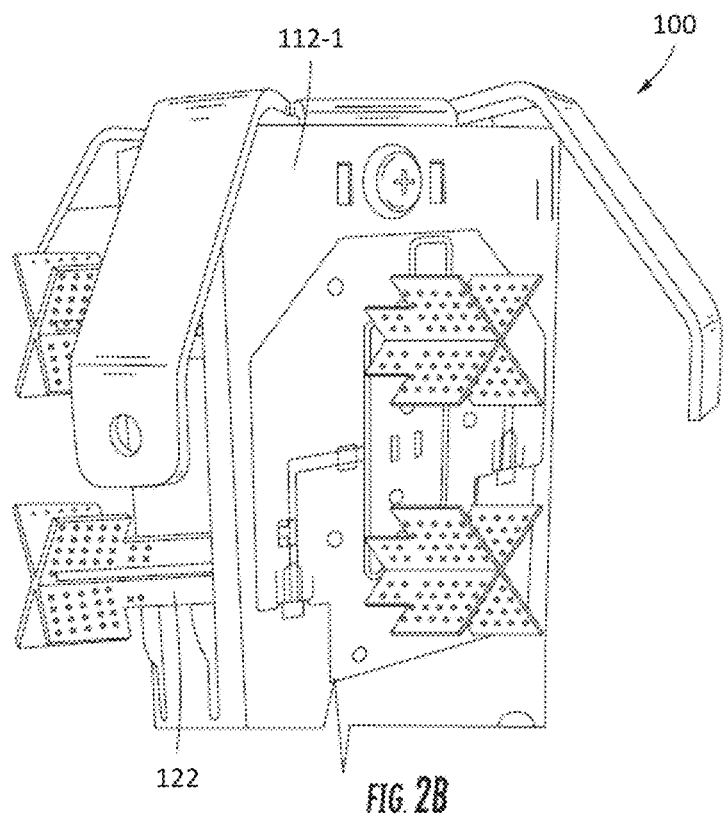
FIG. 2B is a perspective view of one implementation of the base station antenna of FIG. 2A with the radome removed.
Figure 2C:
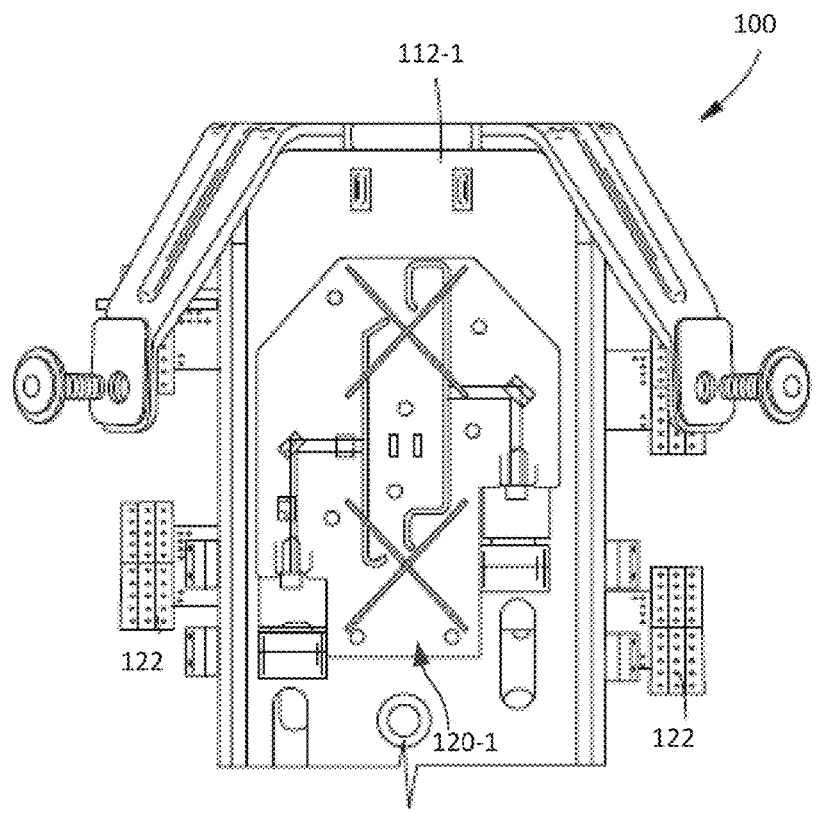
FIG. 2C is a schematic side view of the base station antenna of FIG. 2B with the radome removed.
Figure 2D:
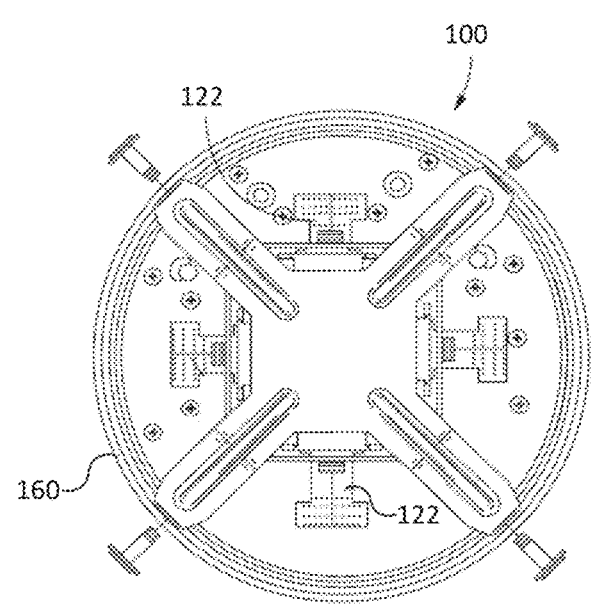
FIG. 2D is a schematic top view of the base station antenna of FIG. 2B.
Figure 3A:
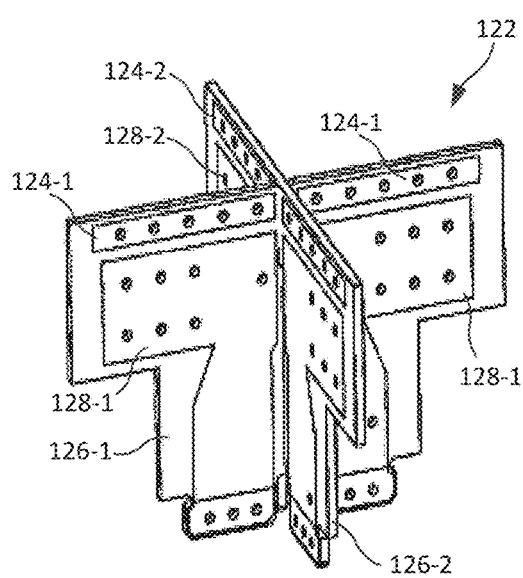
FIGS. 3A-3D are various views of a multiband cross-dipole radiating element that may be used in certain of the base station antennas according to embodiments of the present invention.
Figure 3B:
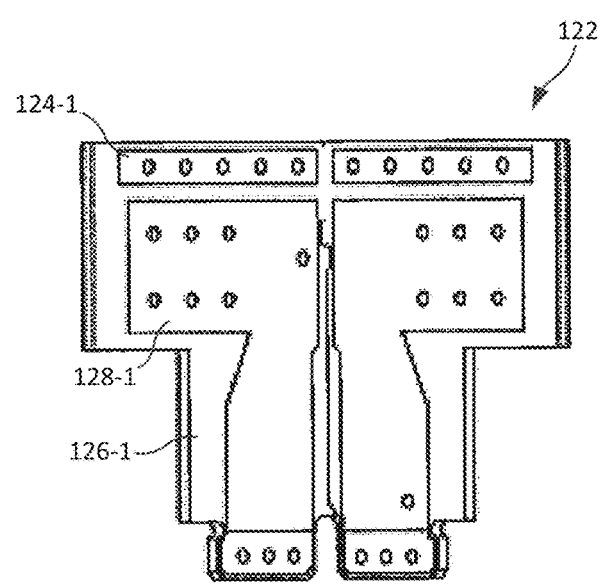
Figure 3C:
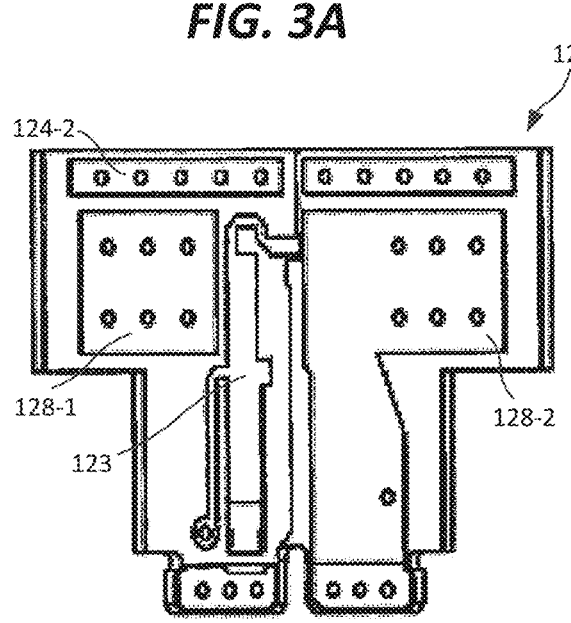
Figure 3D:
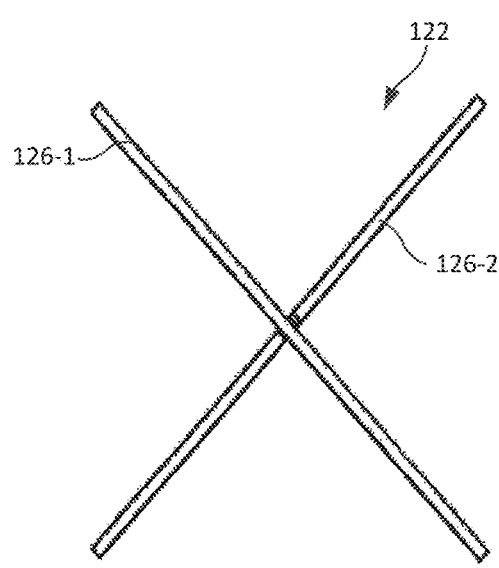

FIGS. 2A-2D are various views of a lensed base station antenna 100 according to embodiments of the present invention. In particular, FIG. 2A is a schematic perspective view of the reflector assembly and radiating elements of the base station antenna 100, FIG. 2B is a perspective view of a physical implementation of the antenna 100 with the radome removed, FIG. 2C is a schematic side view of the antenna 100 with the radome removed, and FIG. 2D is a schematic top view of the antenna 100.

As shown in FIGS. 2A-2D, the base station antenna 100 includes a rectangular tubular reflector assembly 110 that has four vertically-oriented linear arrays 120-1 through 120-4 of radiating elements 122 mounted thereon. Each face of the reflector assembly 110 may comprise a backplane 112-1 through 112-4 that may act as both a reflector and a ground plane for the radiating elements 122 of the linear arrays 120 mounted thereon. The reflector assembly 110 may comprise a unitary structure or may have multiple parts. It should be noted that herein, when multiple like or similar elements are provided, they may be labelled in the drawings using a two-part reference numeral (e.g., backplane 112-2). Such elements may be referred to herein individually by their full reference numeral (e.g., backplane 112-2) and may be referred to collectively by the first part of their reference numeral (e.g., the backplanes 112).

Each linear array 120 is mounted on a respective one of the backplanes 112, and may be oriented vertically with respect to the horizon when the base station antenna 100 is mounted for use. In the depicted embodiment, each linear array 120 includes a total of two radiating elements 122. It will be appreciated, however, that other numbers of radiating elements 122 may be included in the linear arrays 120, including linear arrays 120 that have three or more radiating elements 122 and linear arrays 120 that only have a single radiating element 122. Any appropriate radiating element 122 may be used including, for example, dipole, cross-dipole and/or patch radiating elements. Each of the radiating elements 122 may be identical. The radiating elements 122 may extend forwardly from the respective backplanes 112. As discussed in more detail below, each radiating element 122 may include a pair of dipole radiators, where the radiators of each pair are arranged orthogonally to each other at angles −45° and the +45° with respect to the longitudinal (vertical) axis of the antenna 100. The radiating elements may be, for example, 3.5/5 GHz radiating elements 122 that are designed to transmit and receive signals in both the 3.5 GHz frequency band and in the 5 GHz frequency band. The base station antenna 100 may further include a radome 160 (see FIG. 2D) that covers and protects the radiating elements 122 and other components of the base station antenna 100.

The base station antenna 100 may also include a number of conventional components that are not depicted in FIGS. 2A-2D. For example, a plurality of circuit elements and other structures may be mounted within the reflector assembly 110. These circuit elements and other structures may include, for example, phase shifters for one or more of the linear arrays, remote electronic tilt (RET) actuators for mechanically adjusting the phase shifters, one or more controllers, cabling connections, RF transmission lines and the like. Mounting brackets (not shown) may also be provided for mounting the base station antenna 100 to another structure such as an antenna tower or utility pole. While not shown in FIGS. 2A-2D, the base station antenna 100 may further include an RF lens for each radiating element 222, as discussed in the above-referenced '284 application.

FIGS. 3A-3D are various views of one of the 3.5/5 GHz cross-dipole radiating element 122. As shown in FIGS. 3A-3D, each radiating element 122 may be formed using a pair of printed circuit boards 126-1, 126-2. One of the printed circuit boards 126 includes a forward central slit while the other printed circuit board 126 includes a rearward central slit that allows the two printed circuit boards 126 to be mated together so as to form an "X" shape when viewed from the front as shown best in FIG. 3D.

The radiating element 122 includes a pair of 3.5 GHz dipole arms 128-1, 128-2 that are directly driven through respective baluns 123. The radiating element 122 further includes 5 GHz dipole arms 124-1, 124-2 that are located forwardly of the 3.5 GHz dipole arms 128-1, 128-2. When a 3.5 GHz signal is input to a balun 123, it is fed directly to the 3.5 GHz dipoles 128-1, 128-2. When a 5 GHz signal is input to the balun, the energy electromagnetically couples to the 5 GHz parasitic dipole arms 124-1, 124-2 which then resonate at 5 GHz.

Figure 4A:
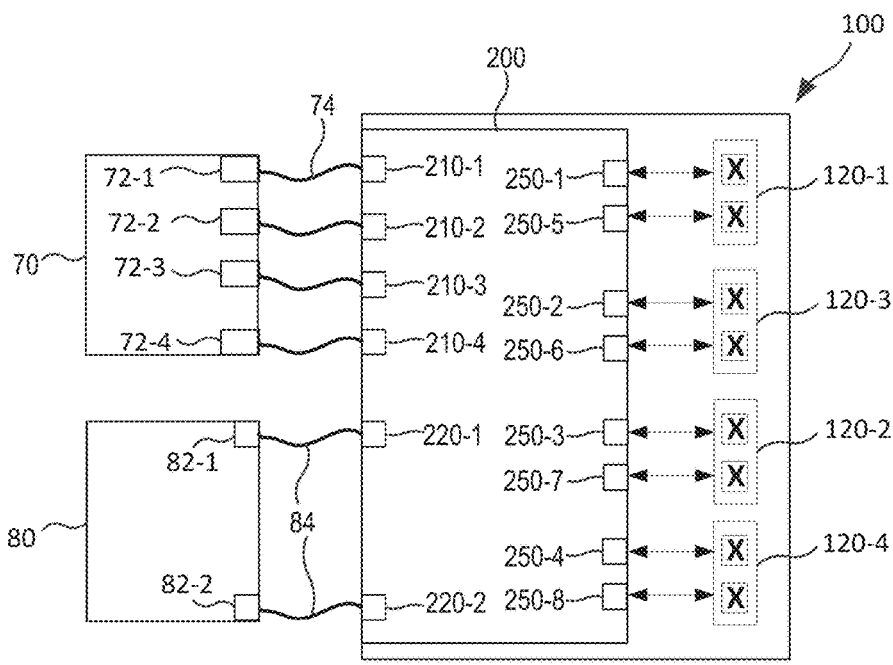
FIG. 4A is a block diagram illustrating the connections between a feed network according to embodiments of the present invention and a pair of radios.
Figure 4B:
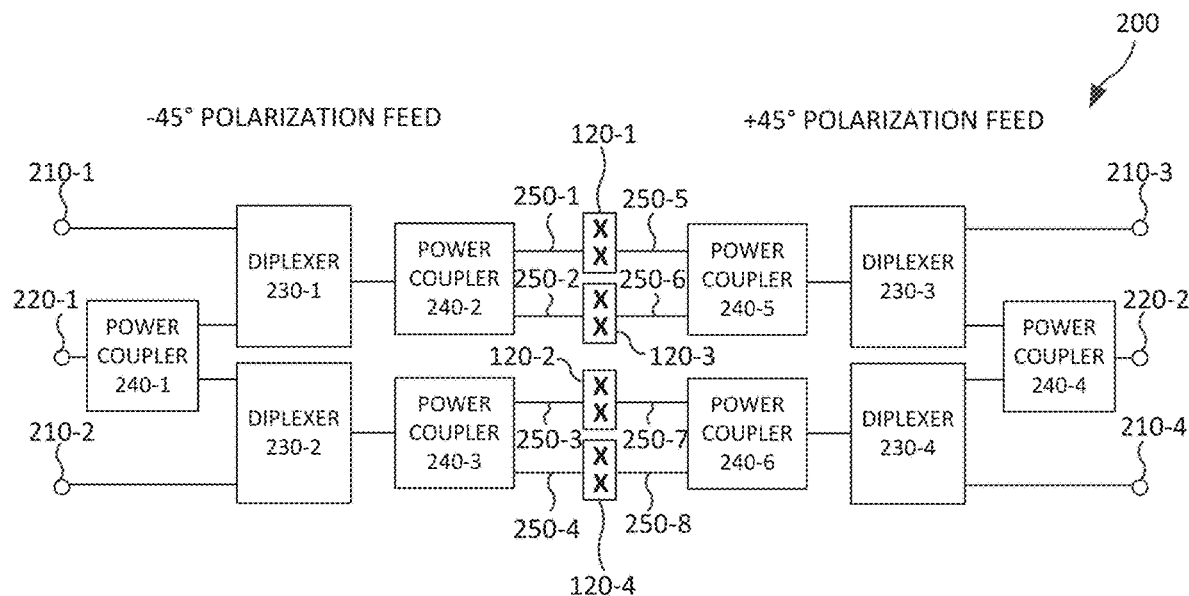
FIG. 4B is a block diagram illustrating one example implementation of the feed network of FIG. 4A.
Figure 4C:
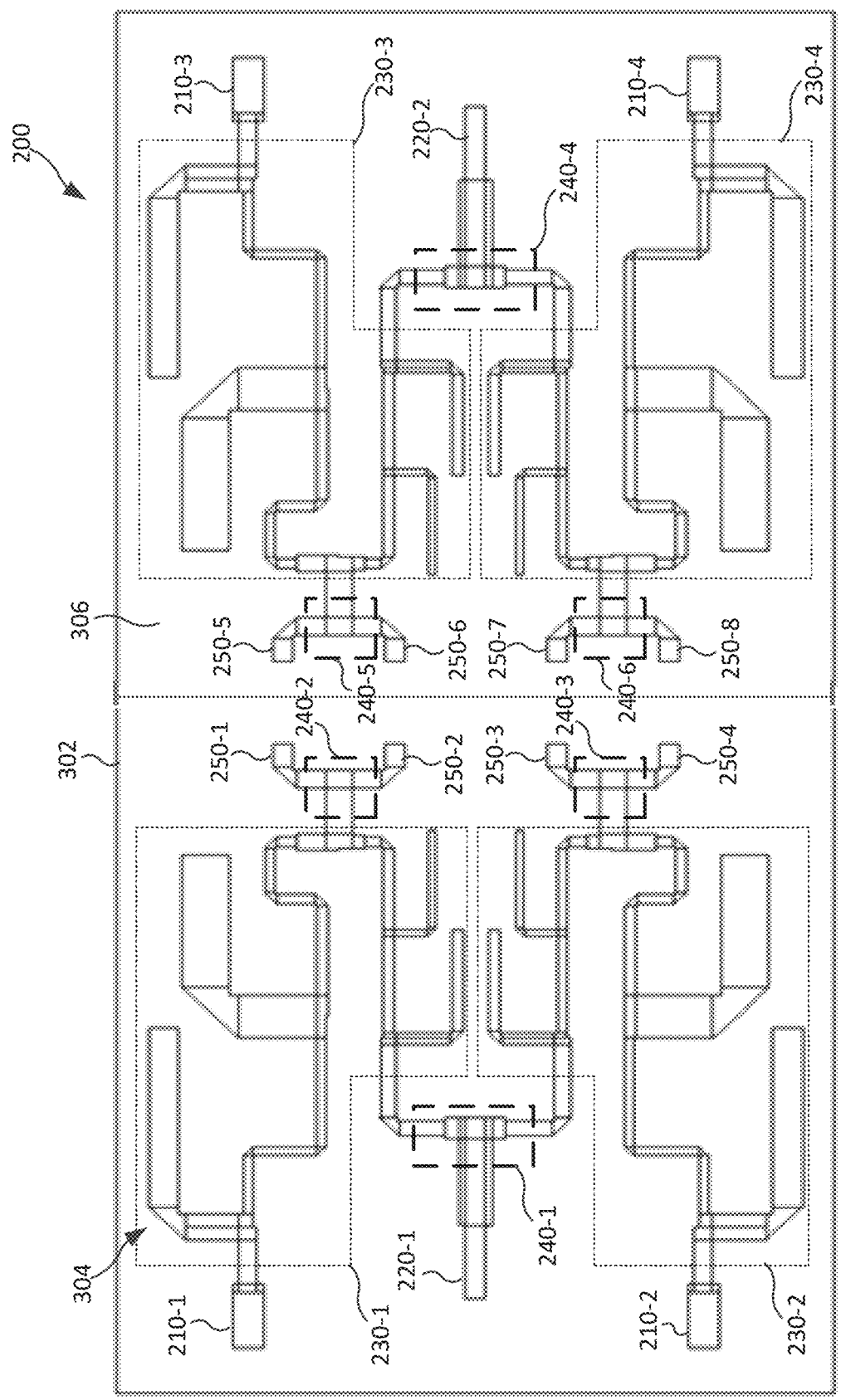
FIG. 4C is a plan view of a printed circuit board implementation of the feed network of FIG. 4A.
Figure 4D:
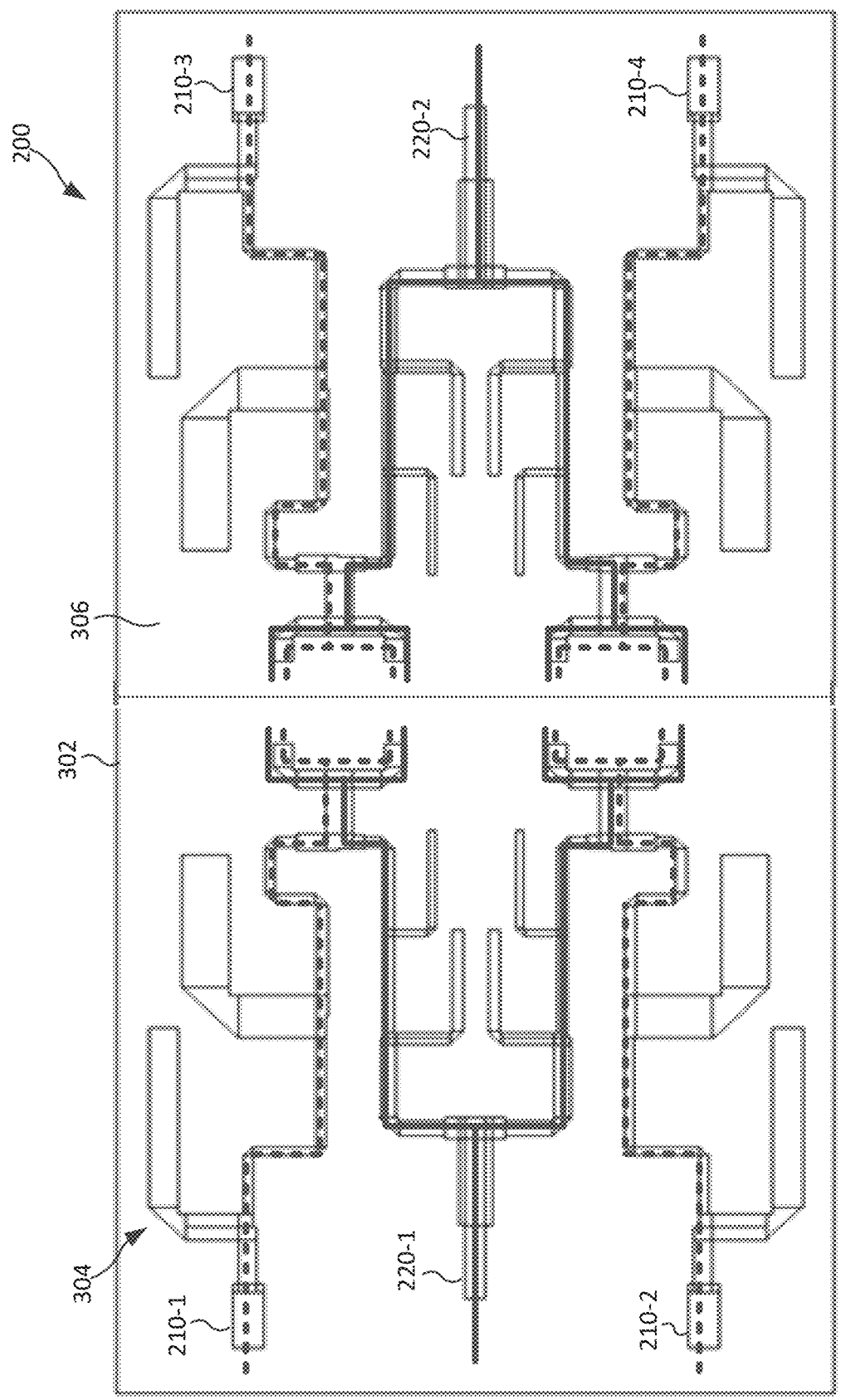
FIG. 4D is the plan view of FIG. 4C with the paths for the 3.5 GHz and 5 GHz signals shown using overlaid dotted and solid lines, respectively.

FIGS. 4A-4D illustrate a feed network 200 that may be included in some embodiments of the base station antenna 100 of FIGS. 2A-2D. In particular, FIG. 4A is a block diagram illustrating the connections between the feed network 200 and 3.5 GHz and 5 GHz radios. FIG. 4B is a block diagram illustrating one example implementation of the feed network 200. FIG. 4C is a plan view of a printed circuit board implementation of the feed network of FIG. 4B. FIG. 4D is the plan view of FIG. 4C with the paths for the 3.5 GHz and 5 GHz signals shown using overlaid bold dotted and solid lines, respectively.

As shown in FIG. 4A, in an example embodiment, the feed network 200 may be fed by both a 3.5 GHz radio 70 and a 5 GHz radio 80. The 3.5 GHz radio 70 has four ports 72-1 through 72-4, while the 5 GHz radio 80 has two ports 82-1 and 82-2. Duplexing of the transmit and receive channels is performed internal to the radios 72, 82, so each port 72, 82 on the radios 70, 80 passes both transmitted and received RF signals. Each of the ports 72, 82 may comprise a standard connector port such as a 7/16 DIN connector port, a mini-DIN connector port or a 4.3/10 connector port. Radio ports 72-1, 72-2 may be 3.5 GHz ports having a first polarization and radio ports 72-3, 72-4 may be 3.5 GHz ports having a second polarization. Radio port 82-1 may be a 5 GHz port having the first polarization and radio port 82-2 may be 5 GHz port having the second polarization.

As is further shown in FIG. 4A, the feed network 200 may have a total of six inputs 210-1 through 210-4 and 220-1, 220-2. Inputs 210-1 through 210-4 may be connected to radio ports 72-1 through 72-4, respectively, via coaxial cables 74, and inputs 220-1 and 220-2 may be connected to radio ports 82-1 and 82-2, respectively, via coaxial cables 84. The feed network 200 may include a total of eight outputs 250-1 through 250-8. Outputs 250-1 and 250-5 are coupled to linear array 120-1, outputs 250-2 and 250-6 are coupled to linear array 120-3, outputs 250-3 and 250-7 are coupled to linear array 120-2, and outputs 250-4 and 250-8 are coupled to linear array 120-4. While ports 210-1 through 210-4 and 220-1, 220-2 are referred to as "inputs" and ports 250-1 through 250-8 are referred to as "outputs"—which describe the case when the antenna 100 is transmitting RF signals—it will be appreciated that when the antenna 100 is receiving RF signals that ports 250-1 through 250-8 will operate as "inputs" and that ports 210-1 through 210-4 and 220-1, 220-2 will operate as "outputs" due to the reversal of the direction of travel of the RF signals.

Referring next to FIG. 4B, the structure of an example embodiment of the feed network 200 is illustrated in greater detail. Inputs 210-1, 210-2 receive 3.5 GHz RF signals having the first polarization from radio ports 72-1, 72-2, respectively, and input ports 210-3, 210-4 receive 3.5 GHz RF signals having the second polarization from radio ports 72-3, 72-4, respectively. Input port 220-1 receives 5 GHz RF signals having the first polarization from radio port 82-1 and input port 220-2 receives 5 GHz RF signals having the second polarization from radio port 82-2.

As discussed above, each radiating element 122 of the linear arrays 120 includes a pair of 3.5 GHz dipole radiators that are arranged orthogonally to each other at angles of −45° and +45° with respect to the longitudinal (vertical) axis of the antenna 100. The provision of four ports 72 on radio 70 allows the radio 70 to feed signals to two different subsets of the linear arrays 120 of base station antenna 100 at two different (orthogonal) polarizations. Each radiating element 122 also includes a pair of 5 GHz dipole radiators that are arranged orthogonally to each other at angles of −45° and +45° with respect to the longitudinal (vertical) axis of the antenna 100. The provision of two ports 82 on the 5 GHz radio 80 allows the radio 80 to feed signals at two different (orthogonal) polarizations to all four linear arrays 120 of base station antenna 100. Since the base station antenna 100 has slant −45°/+45° cross-dipole radiating elements 122, the two polarizations will be referred to herein as the −45° and the +45° polarizations.

As shown in FIG. 4B, the 3.5 GHz inputs 210-1, 210-2 may be connected to first inputs of first and second diplexers 230-1, 230-2. The 5 GHz input 220-1 is connected to an input of a first power coupler 240-1. The first power coupler 240-1 may be any conventional power coupler including, for example, a Wilkinson power coupler. The first power coupler 240-1 may equally split 5 GHz signals supplied thereto in some embodiments. The outputs of the first power coupler 240-1 may be connected to second inputs of the first and second diplexers 230-1, 230-2, respectively. The first and second diplexers 230-1, 230-2 may each receive both a 3.5 GHz signal and a 5 GHz signal and combine those signals and output the combined signals to respective second and third power couplers 240-2, 240-3. The second and third power couplers 240-2, 240-3 may equally split the combined 3.5/5 GHz signals supplied thereto in some embodiments. The outputs of second power coupler 240-2 may be supplied to linear arrays 120-1, 120-3, respectively, and the outputs of third power coupler 240-3 may be supplied to linear arrays 120-2, 120-4, respectively.

Input ports 210-1 and 210-2 will pass 3.5 GHz energy and will reject 5 GHz energy, while input port 220-1 will pass 5 GHz energy and reject 3.5 GHz energy. Thus, all of the 3.5 GHz energy injected at input port 210-1 will pass to power coupler 240-2, and all of the 3.5 GHz energy injected at input port 210-2 will pass to power coupler 240-3. Power coupler 240-2 will evenly split the 3.5 GHz energy that is passed thereto between linear arrays 120-1, 120-3 to generate a first antenna pattern having a peanut-shaped cross-section in the azimuth plane, and power coupler 240-3 will evenly split the 3.5 GHz energy that is passed thereto between linear arrays 120-2, 120-4 to generate a second antenna pattern having a peanut-shaped cross-section in the azimuth plane. The 3.5 GHz energy that passes from input ports 210-1, 210-2 to power couplers 240-2 and 240-3, respectively, is rejected from passing backwards towards power coupler 240-1 due to operation of the diplexers 230-1, 230-2, respectively.

Likewise, the 3.5 GHz input ports 210-3, 210-4 may be connected to first inputs of the third and fourth diplexers 230-3, 230-4, respectively. The 5 GHz input 220-2 is connected to an input of a fourth power coupler 240-4. The fourth power coupler 240-4 may equally split the 5 GHz signal supplied thereto in some embodiments. The outputs of the fourth power coupler 240-4 may be connected to second inputs of the third and fourth diplexers 230-3, 230-4. The third and fourth diplexers 230-3, 230-4 may each receive both a 3.5 GHz signal and a 5 GHz signal and combine those signals and output the combined signals to respective fifth and sixth power couplers 240-5, 240-6. The fifth and sixth power couplers 240-5, 240-6 may equally split the combined 3.5/5 GHz signals supplied thereto in some embodiments. The outputs of the fifth power coupler 240-5 may be supplied to linear arrays 120-1, 120-3, respectively, and the outputs of the sixth power coupler 240-6 may be supplied to linear arrays 120-2, 120-4, respectively.

Input ports 210-3 and 210-4 will pass 3.5 GHz energy and will reject 5 GHz energy, while input 220-2 will pass 5 GHz energy and reject 3.5 GHz energy. Thus, all of the 3.5 GHz energy injected at input port 210-3 will pass to power coupler 240-5, and all of the 3.5 GHz energy injected at input port 210-4 will pass to power coupler 240-6. Power coupler 240-5 will evenly split the 3.5 GHz energy that is passed thereto between linear arrays 120-1, 120-3 to generate a third antenna pattern having a peanut-shaped cross-section in the azimuth plane, and power coupler 240-6 will evenly split the 3.5 GHz energy that is passed thereto between linear arrays 120-2, 120-4 to generate a fourth antenna pattern having a peanut-shaped cross-section in the azimuth plane. The 3.5 GHz energy that passes from input ports 210-3, 210-4 to power couplers 240-5 and 240-6, respectively, is rejected from passing backwards towards power coupler 240-4 due to operation of the diplexers 230-3, 230-4, respectively.

Thus, the feed network 200 feeds a first 3.5 GHz signal having a −45° polarization from radio port 72-1 to linear arrays 120-1 and 120-3 of base station antenna 100. Likewise, a second 3.5 GHz signal having the −45° polarization, is fed from radio port 72-2 to linear arrays 120-2 and 120-4 of base station antenna 100.

Figure 5A:
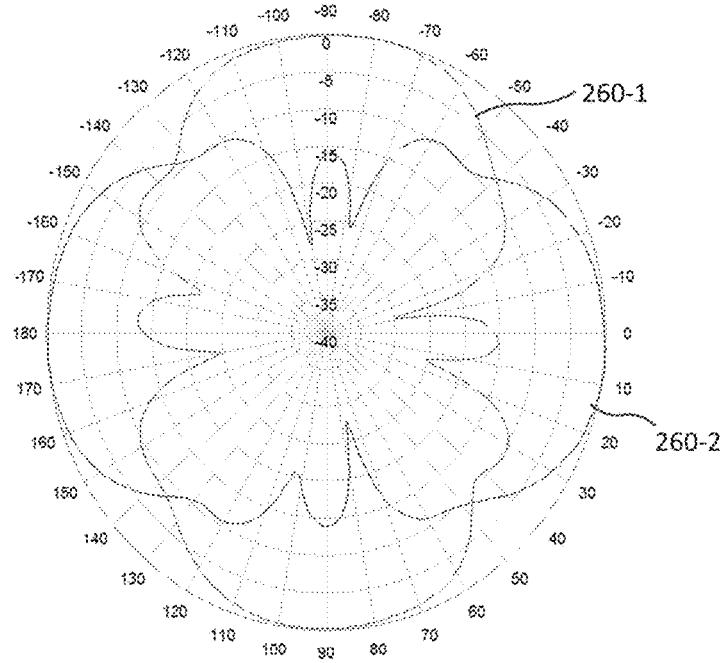
FIGS. 5A and 5B are the 3.5 GHz and 5 GHz azimuth patterns for the base station antenna of FIGS. 2A-2D having the feed network of FIG. 4A.

FIG. 5A is a graph of the simulated azimuth pattern of the first and second antenna beams 260-1, 260-2 that antenna 100 generates in response to the first and second 3.5 GHz signals. As shown in FIG. 5A, each antenna beam 260-1, 260-2 has a generally peanut shaped pattern. Herein, a "generally peanut shaped pattern" refers to an antenna pattern having a generally bi-lobed cross-section through the azimuth plane, where the two lobes extend away from the antenna in opposite directions. Antenna beam 260-1 is rotated 90° with respect to antenna beam 260-2 due to the fact that linear arrays 120-1 and 120-3 are rotated 90° with respect to linear arrays 120-2 and 120-4, respectively. Together, the two antenna beams 260-1, 260-2 may provide generally omnidirectional coverage in the azimuth plane. Since the radio 70 also includes third and fourth ports 72-3 and 72-4 that transmit 3.5 GHz signals having a +45° polarization, the antenna 100 may also generate two additional 3.5 GHz beams having the +45° polarization that will be identical to the antenna beams 260-1, 260-2 discussed above with reference to FIG. 5A. Thus, the antenna 100 may generate a total of four 3.5 GHz antenna beams.

The 5 GHz signals are fed to the linear arrays 120 in a different fashion. In particular, a first 5 GHz signal having a −45° polarization is fed from radio port 82-1 to all four linear arrays 120-1 through 120-4 and a second 5 GHz signal having a +45° polarization is similarly fed from radio port 82-2 to all four linear arrays 120-1 through 120-4. In particular, as noted above, input port 220-1 will pass 5 GHz energy and reject 3.5 GHz energy. Thus, all of the 5 GHz energy injected at input port 220-1 will pass to power coupler 240-1, which will evenly split and pass the 5 GHz energy that is passed thereto to diplexers 230-1, 230-2. The 5 GHz energy passes from diplexer 230-1 to power coupler 240-2 and from diplexer 230-2 to power coupler 240-3, and the 5 GHz energy will not flow down the outside paths towards input ports 210-1 and 210-2 due to operation of the diplexers 230-1, 230-2, respectively. Power coupler 240-2 will evenly split the 5 GHz energy between linear arrays 120-1, 120-3 and power coupler 240-3 will evenly split the 5 GHz energy between linear arrays 120-2, 120-4. Since the 5 GHz radiation emitted from each linear array 120 comes from a single input, the resulting antenna beam may have a generally omnidirectional cross-section in the azimuth plane. The 5 GHz energy injected at input port 220-2 is passed in the same fashion to the four linear arrays 120 though power couplers 240-4, 240-5, 240-6 and diplexers 230-3, 230-4, and hence more detailed description thereof will be omitted here.

Figure 5B:
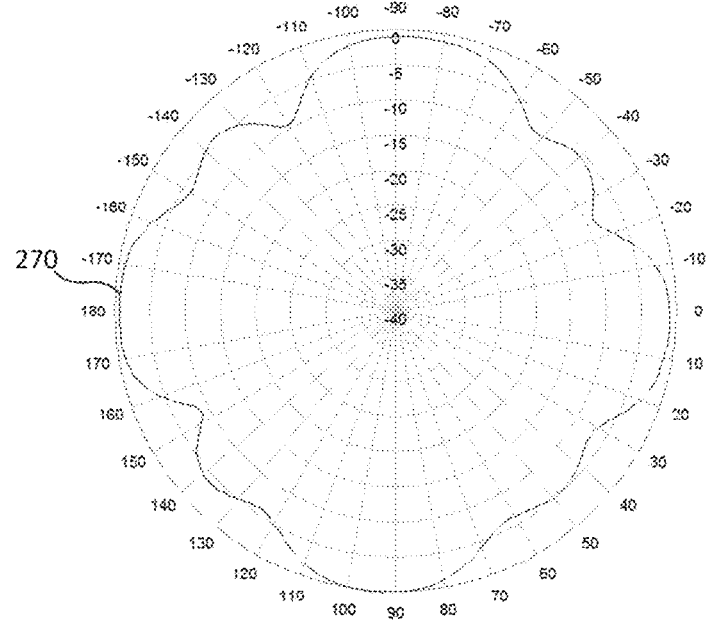

FIG. 5B is a graph of the simulated azimuth pattern of the antenna beam 270 that antenna 100 generates in response to the first 5 GHz signal. As shown in FIG. 5B, the antenna beam 270 has a generally omnidirectional cross-section in the azimuth plane. The second 5 GHz signal having the +45° polarization will operate in the same manner as described above and will generate an antenna beam that is identical to antenna beam 270.

It will be appreciated that each linear array 120 may include a power coupler that splits (for signals flowing in the transmit direction) an RF signal supplied thereto from the feed network 200 into first and second sub-components that are supplied to the respective first and second radiating elements 122 of the linear array 120. This power split may be equal or unequal. In some embodiments, the sub-components of each split signal may be fed to the radiating elements 122 of the linear arrays 120 with the same phase delay, while in other embodiments a phase taper may be applied to the signals fed to the two radiating elements 122 of each linear array 120 in order to affect electronic downtilts to the elevation patterns of the antenna beams. It should be noted that if such a downtilt is applied the degree of downtilt will be different for the 3.5 GHz and 5 GHz signals, as a fixed length delay line will result in different amounts of downtilt at 3.5 GHz and 5 GHz.

With the introduction of various fourth generation ("4G") and fifth generation ("5G") cellular technologies, base stations are employing antennas that have multi-input-multi-output ("MIMO") capabilities. MIMO refers to a technique where a signal is output through multiple ports of a radio and transmitted through multiple different antenna arrays (or sub-arrays) that are, for example, spatially separated from one another and/or at orthogonal polarizations. Signals from each port of the radio may be transmitted over channels having different characteristics due to the spatial separation between the antenna arrays and the different channel conditions that are typically experienced at orthogonal polarizations. The use of MIMO transmission techniques may help overcome the negative effects of multipath fading, reflections of the transmitted signal off of buildings and the like to provide enhanced transmission quality and capacity. Small cell base stations are often implemented in high-density urban environments. These environments may have numerous buildings which make these environments natural applications for using MIMO transmission techniques. MIMO is typically employed in 4G and 5G applications because, while more expensive, the added capacity typically justifies the increased cost. If the costs of MIMO-capable base station antennas can be reduced then the benefits of using MIMO transmission techniques in terms of network capacity as a function of capital expense may be further increased. The small cell base station antenna 100 may generate four different 3.5 GHz antenna beams 260 (two antenna beams at each of two orthogonal polarizations) and hence may be used to implement 4×MIMO. The small cell base station antenna 100 may generate two different 5 GHz antenna beams 270 (one antenna beam at each of two orthogonal polarizations) and hence may be used to implement 2×MIMO capabilities.

FIG. 4C is a plan view of a printed circuit board implementation of the feed network 200 of FIG. 4B. As shown in FIG. 4C, the feed network 200 may be implemented in a printed circuit board 302. The printed circuit board 302 may comprise, for example, a microstrip printed circuit board that includes a dielectric substrate 306 that has a metal pattern 304 on a top side thereof and a metal ground plane layer on a bottom side thereof (not visible in the plan view of FIG. 4C).

As shown in FIG. 4C, the 3.5 GHz input ports 210-1 through 210-4 and the 5 GHz input ports 220-1, 220-2 may each be implemented as metal pads in the metal pattern 304. The 5 GHz input port 220-1 is connected to an input of a first power coupler 240-1. The diplexers 230-1 through 230-4 may be implemented in the metal pattern 304. The diplexers 230 are shown within the dotted boxes in FIG. 4C. For RF signals flowing in the transmit direction, each diplexer 230 combines a 3.5 GHz RF signal that is received at an input 210 input with a sub-component of a 5 GHz signal that is received from an output of the first power coupler 240-1. For RF signals flowing in the receive direction, each diplexer 230 splits a combined a 3.5/5 GHz RF signal based on frequency to route the 3.5 GHz component to an "input" 210 and to route the 5 GHz component thereof to the power coupler 240-1.

A second power coupler 240-2 is coupled to the output of the first diplexer 230-1, and a third power coupler 240-3 is coupled to the output of the second diplexer 230-2. Each power coupler 240 is implemented as a printed circuit board power coupler using known techniques. The power couplers 240 are shown within the dashed boxes in FIG. 4C. Each output of the second and third power couplers 240-2, 240-3 is coupled to a respective one of the linear arrays 120 of radiating elements 122. As noted above, each linear array 120 may include an associated power coupler (not shown in FIG. 4B or 4C) that, for signals passing in the transmit direction, divides the combined RF signal received at the linear array 120 into sub-components and feeds a respective sub-component to each radiating element 122 of the linear array 120. This power coupler is often implemented on a feedboard printed circuit board of the linear array 120, and hence is referred to herein as a "feedboard power coupler". Since the antenna 100 includes cross-dipole radiating elements 122, the outputs of the feedboard power coupler are coupled to one of the dipole arms of each radiating element (e.g., the −45° arm). As described above with reference to FIGS. 3A-3D, here the 3.5 GHz dipole arms 124 are fed directly by the feed network, and the 5 GHz signals parasitically couple to the 5 GHz dipoles arms 128.

The above description explains the operation of the left half of the feed network 200 of FIG. 4C, which is used to feed the −45° dipole arms 124-1, 128-1 of each radiating element 122. The right half of the of the feed network 200 of FIG. 4C may be identical to the left half, except that the right half is used to feed the +45° dipole arms 124-2, 128-2 of each radiating element 122. Accordingly, further description thereof will be omitted here.

The feed networks according to embodiments of the present invention may distribute power from two radios to four linear arrays of wideband radiating elements, where the power from the two radios is distributed differently. In particular, the power from the first radio may be distributed by the feed networks according to embodiments of the present invention to generate two pairs of "orthogonal" generally peanut-shaped antenna patterns, while the power from the second radio may be distributed by these feed networks to generate a pair of quasi-omnidirectional antenna patterns. The feed network may have three inputs and four outputs for each polarization. The feed network may include a plurality of diplexers that combine signals from the two radios on the transmit path to feed both signals to the radiating elements, and that split signals on the receive path based on frequency so that the received signals are routed to the appropriate radios.

Figure 6:
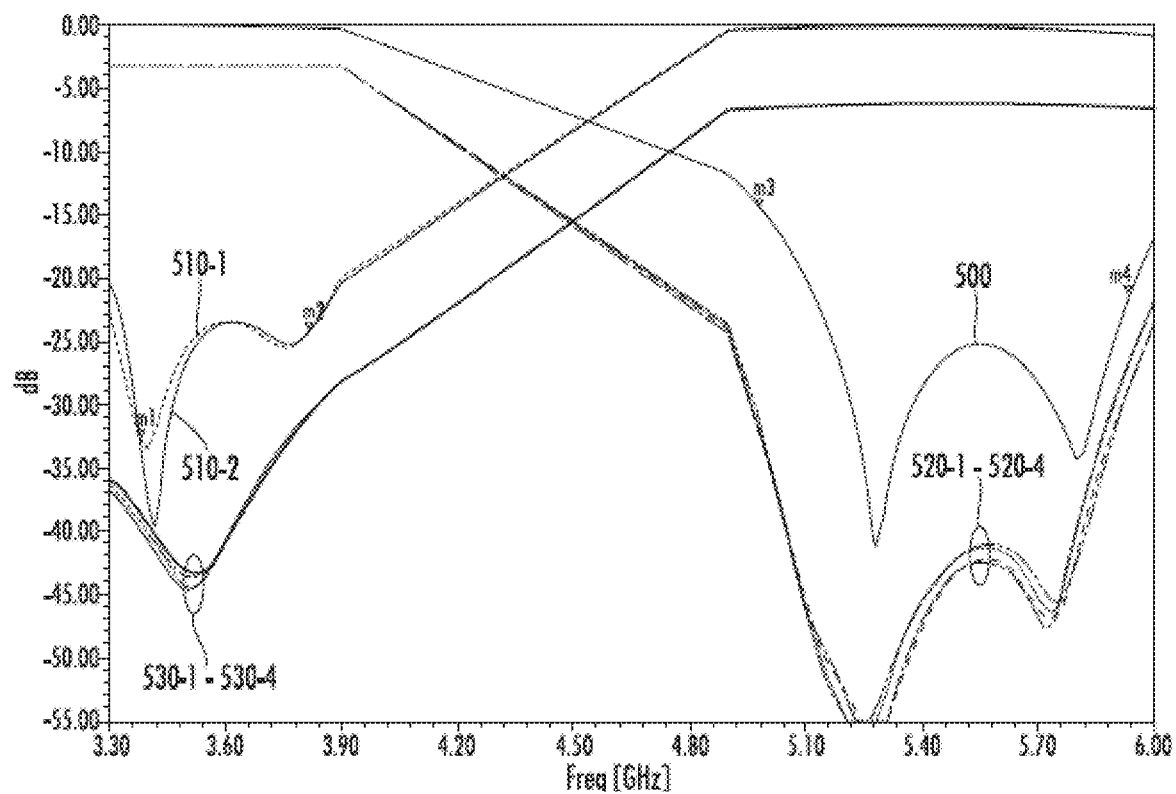
FIG. 6 is a graph illustrating the simulated performance of the feed network of FIG. 4C.

FIG. 6 is a graph illustrating the simulated performance of the feed network 200 of FIG. 4C. In FIG. 6, curve 500 represents the power output at port 220-1 in response to a signal input to port 220-1. As shown, essentially all of the power of a signal in the 3.3-3.9 GHz range injected at port 220-1 is reflected back, whereas in the 5 GHz frequency band signals pass through port 220-1 with little reflection. Likewise, curves 510-1, 510-2 represent the power output at port 210-1 and 210-2 in response to signals input to ports 210-1, 210-2, respectively. As shown, essentially all of the power of a signal in the 5.0-6.0 GHz range injected at either port 210-1 or 210-2 is reflected back, whereas in the 3.3-3.9 GHz frequency band signals pass through port 210-1 and 210-2 with little reflection.

Curves 520-1 and 520-2 show the power output at ports 250-1 and 250-2, respectively, for a signal input at port 210-1, while curves 520-3 and 520-4 show the power output at ports 250-3 and 250-4, respectively, for a signal input at port 210-2. As shown, for signals in the 3.3-3.9 GHz range, the signals output are just over 3 dB down from the input signal, which reflects the power split, while high levels of rejection are provided throughout the 5 GHz frequency range. Similarly, curves 530-1 through 530-4 show the power output at ports 250-1 and 250-2, respectively, for a signal input at port 220-1. As shown, for signals in the 5.0-6.0 GHz range, the signals output are just over 6 dB down from the input signal, which reflects the four-way power split, while high levels of rejection are provided throughout the 3.5 GHz frequency range.

As discussed in the aforementioned '897 application, out-of-phase feeding techniques may be used with respect to the 3.5 GHz signals in some embodiments to provide improved performance. As discussed above, for each polarization, a first 3.5 GHz signal is fed to linear arrays 120-1 and 120-3 and a second 3.5 GHz signal is fed to linear arrays 120-2 and 120-4. When out-of-phase feeding techniques are used, the phase of the sub-component of the first 3.5 GHz signal supplied to linear array 120-1 is made to be different from the phase of the sub-component of the first 3.5 GHz signal supplied to linear array 120-3, and the phase of the sub-component of the second 3.5 GHz signal supplied to linear array 120-2 is made to be different from the phase of the sub-component of the second 3.5 GHz signal supplied to linear array 120-4.

The out-of-phase feeding of two opposed linear arrays 120 may be accomplished by including one or more delay lines or other delay elements on the RF transmission path to one of the two opposed linear arrays 120. Such a delay line may increase the length of the RF transmission path to a first of the opposed linear arrays 120 relative to the second of the opposed linear arrays 120, resulting in the phase of the sub-component of the RF signal arriving at the radiating elements 122 of the first linear array 120 being different than the phase of the sub-component of the RF signal arriving at the radiating elements 122 of the second linear array 120. Such out-of-phase feeding of the linear arrays 120-1, 120-3 (and of linear arrays 120-2, 120-4) may result in a broader bi-directional antenna pattern in the azimuth plane that may be closer in shape to an omnidirectional pattern than the antenna pattern that results when the radiating elements 122 of the linear arrays 120-1, 120-3 (and of linear arrays 120-2, 120-4) are fed in-phase.

In some embodiments, the opposed pairs of linear arrays 120-1, 120-3; 120-2, 120-4 may be fed in "anti-phase," where the phase of the sub-components of the RF signal that are fed to the radiating elements 122 of linear array 120-1 are approximately 180 degrees out-of-phase with respect to the sub-components of the RF signal that are fed to the respective radiating elements 122 of linear array 120-3, and where the sub-components of the RF signal that are fed to the radiating elements 122 of linear array 120-2 are approximately 180 degrees out-of-phase with respect to the sub-components of the RF signal that are fed to the respective radiating elements 122 of linear array 120-4. It will be appreciated, however, that anti-phase feeding (i.e., a 180 degree difference in phase) is just one example embodiment. In other embodiments, the opposed linear arrays 120 may be fed out-of-phase with sub-components of an RF signal that differ by anywhere between 135 degrees and 225 degrees. It will be appreciated that the out-of-phase feeding is separate and distinct from any phase shifts that are applied to the signals fed to individual radiating elements 122 (or sub-arrays of radiating elements) in order to apply an electrical downtilt to the antenna beam.

The above-described small cell base station antennas have linear arrays that include two radiating elements each. In other embodiments, different numbers of radiating elements may be used such as, for example, one radiating element or three or four radiating elements per linear array. When the 5 GHz frequency band is one of the supported frequency bands, government regulations may place limitations on the maximum gain of the antenna in the 5 GHz frequency band. For example, guidelines promulgated by the FCC place restrictions on wireless communications in the UNII-1 (5.15-5.25 GHz) frequency band to reduce or prevent interference with satellite communications that operate in similar frequency ranges. In particular, for all elevation angles greater than 30° above the horizon, the effective isotropic radiated power ("EIRP") must be less than or equal to 125 mW. For a system designed to supply a signal having a maximum power of 0.5 Watts (for two ports) to an antenna array for transmission, this corresponds to the following two specific restrictions:

1. Gain of the array<6 dBi; and
2. All coherent energy in a given linear polarization radiated at angles of 30 degrees or more above the horizon must be suppressed by the gain of the array +6 dB.

Figure 7A:
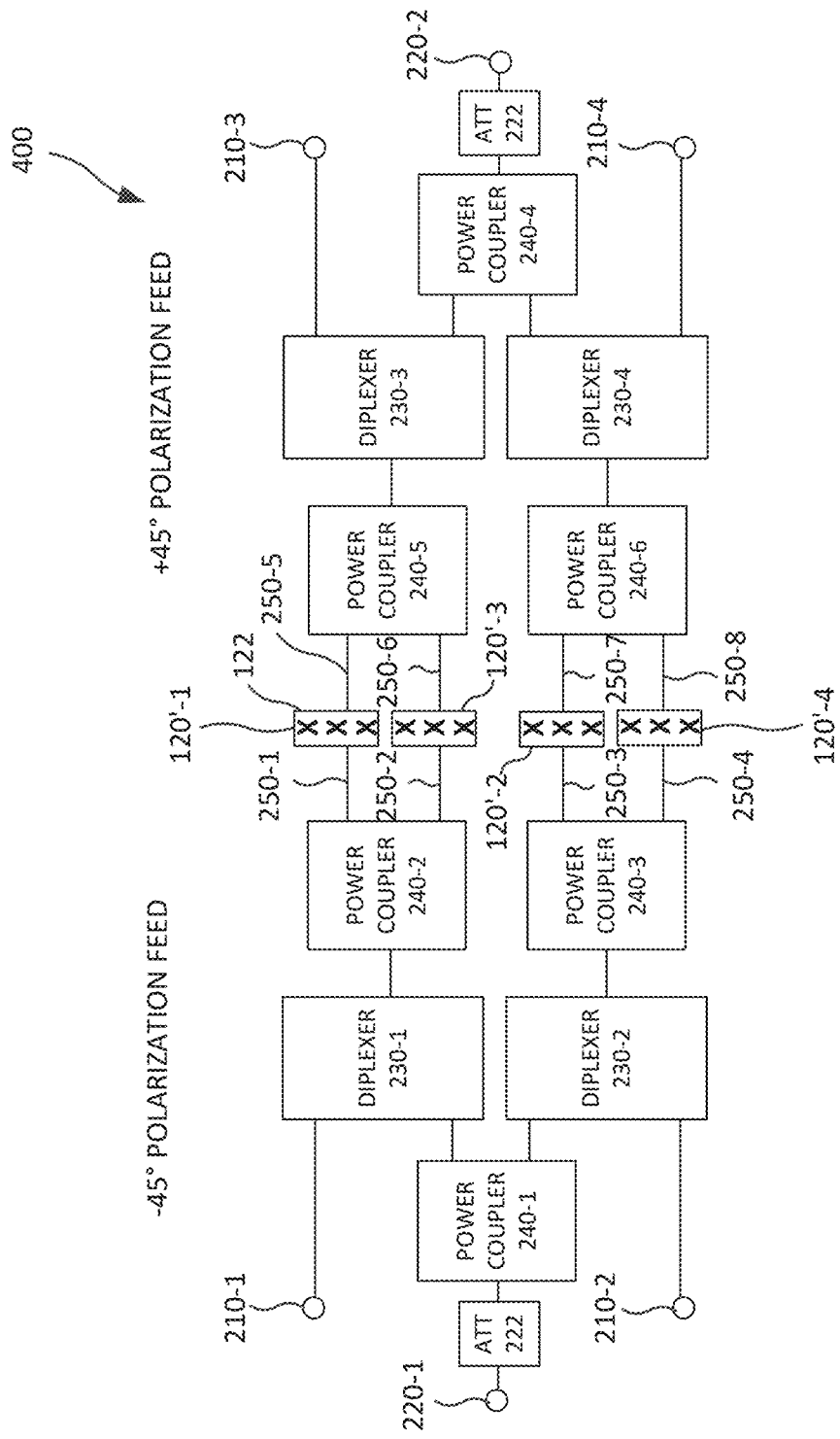
FIG. 7A is a block diagram of a feed network according to further embodiments of the present invention.
Figure 7B:
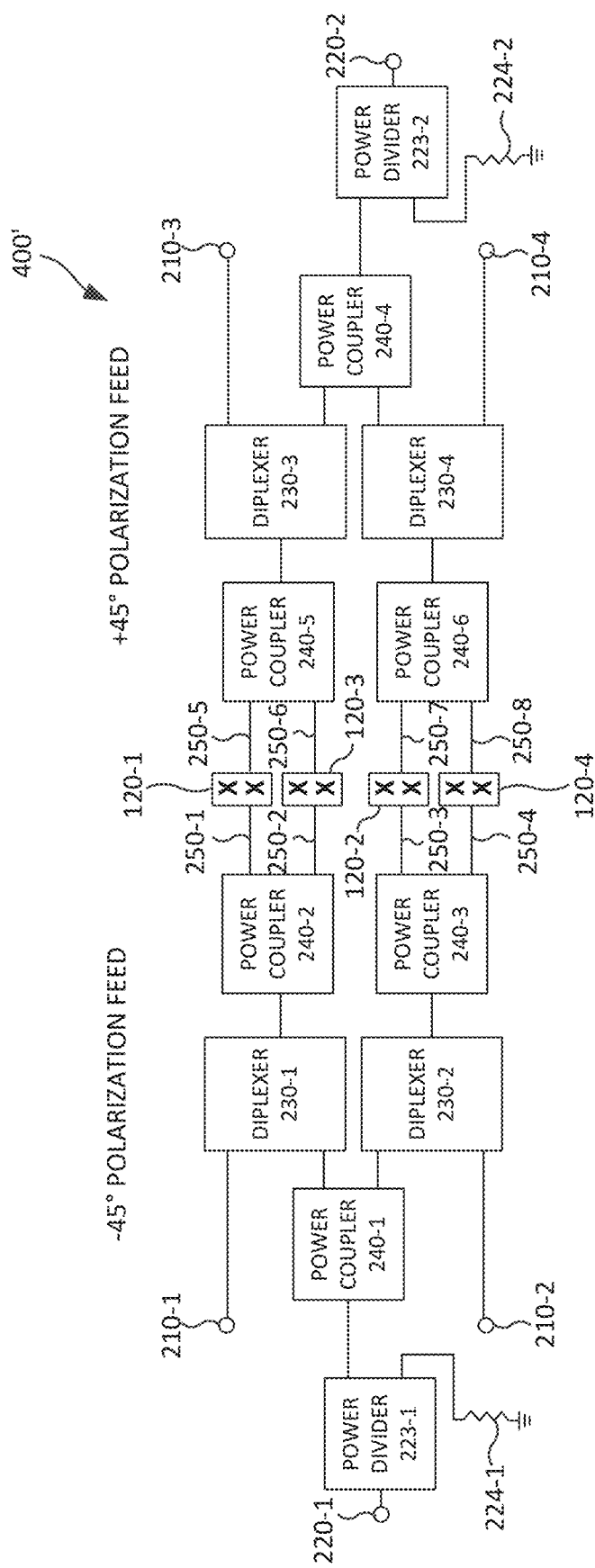
FIG. 7B is a block diagram illustrating a feed network according to still further embodiments of the present invention.

In order to ensure that the gain of the array does not exceed 6 dBi, it may be necessary to reduce the level of the 5 GHz signals that are supplied to the feed network. By including two or less radiating elements per linear array, this maximum gain requirement may be met. However, it will be appreciated that more than two radiating elements may be desired either to increase the gain at 3.5 GHz and/or to narrow the elevation pattern at both 5 GHz and 3.5 GHz. In such embodiments, attenuators may be included in the feed network along the 5 GHz transmission path. FIG. 7A is a block diagram similar to FIG. 4B of a feed network 400 according to embodiments of the present invention that includes three radiating elements 122 per linear array 120' with attenuators 222 provided along the respective 5 GHz transmission paths. As FIG. 7A is identical to FIG. 4B except for the inclusion of the attenuators 222 and the extra radiating element 122 in each linear array 120', further description thereof will be omitted here. One way of implementing the attenuator is to use a power divider to tap off a portion of the RF signal to reduce the level of the RF signal input to the feed network such that the gain is kept below 6 dBi. FIG. 7B is a block diagram illustrating a feed network 400' in which the attenuators 222 of FIG. 7A are implemented using such power dividers and resistive terminations.

As shown in FIG. 7B, in the feed network 400' each attenuator 222 of feed network 400 (see FIG. 7A) is implemented as a power divider 223 and a resistive termination 224. The power dividers 223 are positioned between each 5 GHz input port 220-1, 220-2 and the respective power couplers 240-1, 240-2. The power dividers 223-1, 223-2 may each be implemented as a conventional microstrip power divider such as a T power divider. The input of each power divider 223 is coupled to a respective one of the RF input ports 220, and the first output of each power divider 223 is coupled to the input port of a respective one of the power couplers 240. The second output port of each power divider 223 is coupled to a termination such as, for example, a resistor 224. The amount of power that is coupled to the respective resistors 224 may be set to ensure that the overall gain for the 5 GHz signals is kept below 6 dBi.

As made clear from the above discussion, the feed networks according to embodiments of the present invention may (1) couple a first RF input to all of the linear arrays of a base station antenna while (2) coupling a second RF input to only a subset of the linear arrays of the base station antenna. Consequently, the feed network may have more RF outputs than it has RF inputs. This aspect of the feed networks according to certain embodiments of the present invention is shown with reference to FIG. 8, which is a block diagram of a feed network 600 according to still further embodiments of the present invention.

Figure 8:
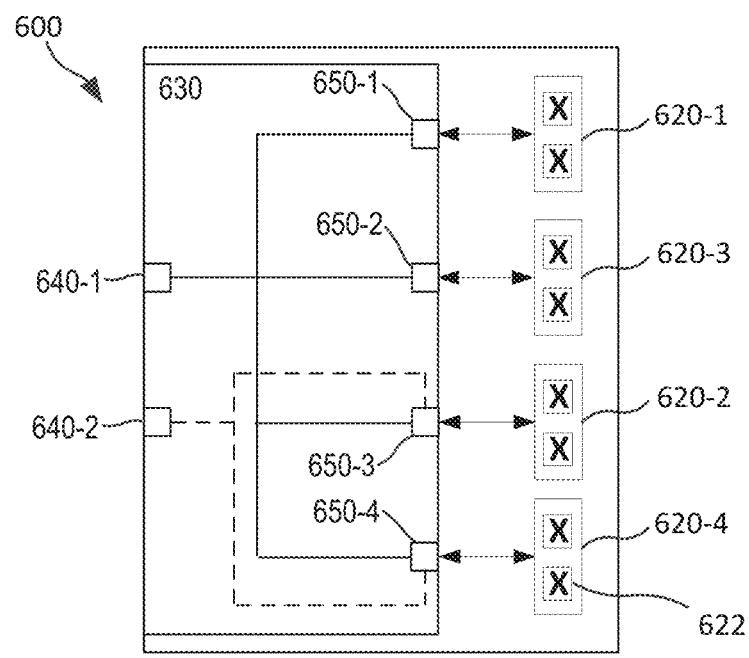
FIG. 8 is a block diagram of a feed network according to still further embodiments of the present invention.

As shown in FIG. 8, a multiband base station antenna 600 includes a plurality of linear arrays 620-1 through 620-4 of radiating elements 622 and a feed network 630. The feed network has first and second RF inputs 640-1, 640-2 and first through fourth RF outputs 650-1 through 650-4. RF input 640-1 may be, for example, a 5 GHz RF input that connects to a port of a 5 GHz radio and RF input 640-2 may be, for example, a 3.5 GHz RF input that connects to a port of a 3.5 GHz radio. RF outputs 650-1 through 650-4 may be coupled to linear arrays 620-1 through 620-4, respectively. RF input 640-1 may be coupled to all of the linear arrays 620-1 through 620-4, while RF input 640-2 may only be coupled to a subset of the linear arrays 620-1 through 620-4 (here linear arrays 620-2 and 620-4). In FIG. 8 the connections between RF input 640-1 and RF output ports 650-1 through 650-4 are shown using solid lines while the connections between RF input 640-2 and RF output ports 650-2 and 650-4 are shown using dashed lines to highlight the different connectivity.

The small cell antenna may include additional linear arrays in other embodiments such as, for example, linear arrays that transmit and receive signals in all or part of the 696-960 MHz frequency band and/or linear arrays that transmit and receive signals in all or part of the 1.7-2.7 GHz frequency band. When the small cell antenna is designed to operate in such additional frequency bands, four linear arrays may be provided for each additional frequency band (i.e., one on each side of the rectangular tubular reflector assembly) or only two linear arrays may be provided that are mounted on opposed faces of the rectangular tubular reflector assembly. The above-referenced '897 application discloses a number of small cell antenna designs that include such additional linear arrays. Any of those antenna designs may be modified to include linear arrays of 3.5/5 GHz wideband radiating elements as described above along with the feed networks according to embodiments of the present invention.

Figure 9A:
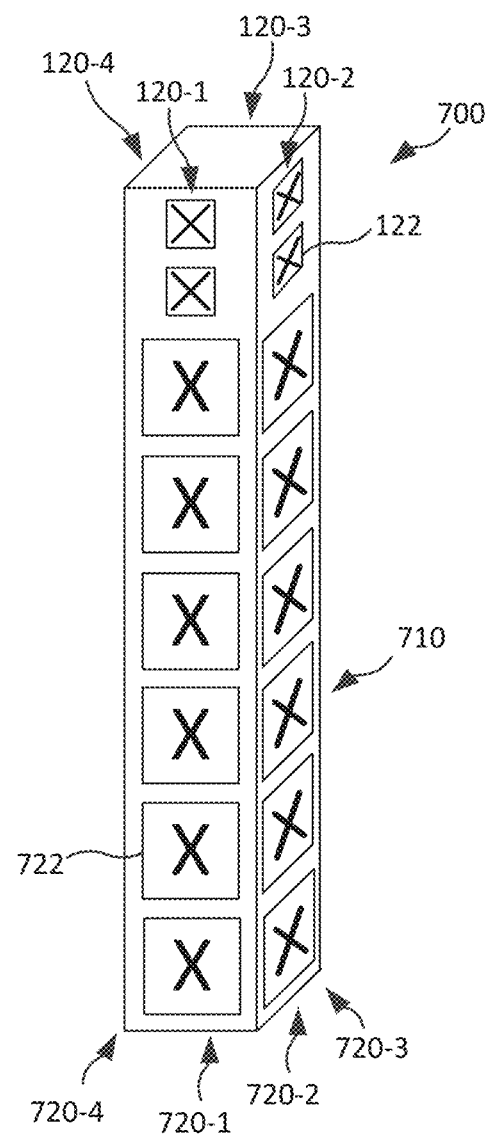

FIGS. 9A and 9B are a schematic plan view and a partial perspective view of a base station antenna according to further embodiments of the present invention (with the radome thereof removed) that illustrates providing additional linear arrays in the base station antenna. As shown in FIGS. 9A-9B, a base station antenna 700 may include an upper portion that has four linear arrays 120 of 3.5/5 GHz radiating elements 122. The upper portion of base station antenna 700 may be identical to base station antenna 100 described above, and hence further description thereof will be omitted. The base station antenna 700 further includes four additional linear arrays 720-1 through 720-4 of radiating elements 722. Each linear array 720 is mounted below a respective one of the linear arrays 120. In the depicted embodiment, each linear array 720 includes six radiating elements that are configured to transmit and receive signals in the 1.7-2.7 GHz frequency band. A separate feed network (not shown) may be provided that connects the radiating elements 722 to the ports of a radio that operates in the 1.7-2.7 GHz frequency band.

It will be appreciated that numerous modifications may be made to the small cell base station antenna and feed networks according to embodiments of the present invention. For example, while the above embodiments are primarily described with respect to antennas that transmit and receive signals in some or all of the 3.5 GHz and 5 GHz frequency bands, it will be appreciated that, in other embodiments, the antenna may transmit and receive signals in different frequency bands, and that the diplexers and radiating elements may be modified accordingly to support communications in such different frequency bands.

As another example, while the feed networks described above are designed to feed signals to antennas having dual-polarized radiating elements, it will be appreciated that in other embodiments half of each feed network may be omitted and the feed networks may be used with antennas having single polarization radiating elements.

As yet another example, the above embodiments of the present invention are implemented in base station antennas having tubular reflector assemblies that have rectangular horizontal cross-sections. In other embodiments, the tubular reflector may have other shapes of horizontal cross-sections, such as triangular or hexagonal cross-sections. In still other embodiments, the antennas may alternatively be panel antennas in which all of the linear arrays are mounted on a common reflector and have radiating elements that point in the same direction.

The present invention has been described above with reference to the accompanying drawings. The invention is not limited to the illustrated embodiments; rather, these embodiments are intended to fully and completely disclose the invention to those skilled in this art. In the drawings, like numbers refer to like elements throughout. Thicknesses and dimensions of some elements may not be to scale.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

Features and elements of any of the above-described embodiments may be incorporated into other embodiments to provide additional embodiments.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

That which is claimed is:

1. A multiband base station antenna, comprising:
a first linear array of radiating elements;
a second linear array of radiating elements;
a third linear array of radiating elements;
a fourth linear array of radiating elements;
a feed network having:
a first radio frequency ("RF") input that is configured to receive a first RF signal that is within a first frequency band;
a second RF input that is configured to receive a second RF signal that is within a second frequency band that is different than the first frequency band;
a first RF output that is coupled to the radiating elements of the first linear array;
a second RF output that is coupled to the radiating elements of the second linear array;
a third RF output that is coupled to the radiating elements of the third linear array;
a fourth RF output that is coupled to the radiating elements of the fourth linear array, wherein the feed network couples the first RF input to at least the first linear array and the third linear array and couples the second RF input to at least the first and third linear arrays.

2. The multiband base station antenna of claim 1, wherein the feed network includes a first diplexer that has a first input that is coupled to the first RF input and a second input that is coupled to the second RF input.

3. The multiband base station antenna of claim 2, further comprising a third RF input that is configured to receive a third RF signal that is within the second frequency band.

4. The multiband base station antenna of claim 3, further comprising a second diplexer that has a first input that is coupled to the third RF input.

5. The multiband base station antenna of claim 2, wherein the feed network further includes
a first power coupler that is electrically coupled between the first RF input and the first and third RF outputs; and
a second power coupler that is electrically coupled between the first RF input and the second and fourth RF outputs.

6. The multiband base station antenna of claim 1, wherein the first linear array of radiating elements is mounted in front of a first backplane, the second linear array of radiating elements is mounted in front of a second backplane, the third linear array of radiating elements is mounted in front of a third backplane, the fourth linear array of radiating elements is mounted in front of a fourth backplane, and wherein the first linear array of radiating elements is positioned generally opposite the third linear array of radiating elements, and the second linear array of radiating elements is positioned generally opposite the fourth linear array of radiating elements.

7. The multiband base station antenna of claim 1, wherein the first and third linear arrays of radiating elements are configured to generate a first antenna beam that has a peanut-shaped cross-section in the azimuth plane, and the second and fourth linear arrays of radiating elements are configured to generate a second antenna beam that has a peanut-shaped cross-section in the azimuth plane.

8. The multiband base station antenna of claim 1, further comprising:
a fifth linear array of radiating elements that is mounted in front of the first backplane; and
a sixth linear array of radiating elements that is mounted in front of the third backplane;
wherein the fifth and sixth linear arrays of radiating elements are configured to transmit and receive RF signals in a third frequency band that is different than the first and second frequency bands.

9. The multiband base station antenna of claim 1, wherein the feed network is further configured to couple the second RF input to only the first and third linear arrays.

10. A multiband base station antenna, comprising:
a first linear array of radiating elements;
a second linear array of radiating elements;
a third linear array of radiating elements;
a fourth linear array of radiating elements;
a feed network having:
a first radio frequency ("RF") input that is configured to receive a first RF signal that is within a first frequency band;
a second RF input that is configured to receive a second RF signal that is within a second frequency band that is different than the first frequency band;
a first RF output that is coupled to the radiating elements of the first linear array;
a second RF output that is coupled to the radiating elements of the second linear array;
a third RF output that is coupled to the radiating elements of the third linear array;
a fourth RF output that is coupled to the radiating elements of the fourth linear array,
a first power coupler that is electrically coupled between the first RF input and the first and third RF outputs; and
a second power coupler that is electrically coupled between the first RF input and the second and fourth RF outputs.

11. The base station antenna of claim 10, further comprising a first diplexer that has a first input that is coupled to the first RF input and an output.

12. The base station antenna of claim 11, further comprising a second diplexer that has a first input that is coupled to the first RF input and an output that is coupled to the second power coupler.

13. The base station antenna of claim 10, wherein the second RF input is only coupled to the first and third linear arrays.

14. The base station antenna of claim 13, wherein the feed network further includes a third RF input that is configured to receive a third RF signal that is within the second frequency band, and wherein the third RF input is only coupled to the second and fourth linear arrays.

15. The base station antenna of claim 10, wherein the first through fourth linear arrays are mounted to extend forwardly from first through fourth backplanes of a tubular reflector having a rectangular cross-section.

16. The base station antenna of claim 10, wherein the first RF input is coupled to at least two of the first through fourth linear arrays.

17. The base station antenna of claim 10, wherein the first and third linear arrays point in opposite directions and the second and fourth linear arrays point in opposite directions, and wherein the first and third linear arrays are configured to generate a first antenna beam that has a first peanut-shaped cross-section in an azimuth plane and the second and fourth linear arrays are configured to generate a second antenna beam that has a second peanut-shaped cross-section in the azimuth plane.

18. The multiband base station antenna of claim 10, wherein the first and third linear arrays of radiating elements are configured to generate a first antenna beam that has a peanut-shaped cross-section in the azimuth plane, and the second and fourth linear arrays of radiating elements are configured to generate a second antenna beam that has a peanut-shaped cross-section in the azimuth plane.

19. The multiband base station antenna of claim 10, further comprising:
a fifth linear array of radiating elements that is mounted in front of the first backplane; and
a sixth linear array of radiating elements that is mounted in front of the third backplane;
wherein the fifth and sixth linear arrays of radiating elements are configured to transmit and receive RF signals in a third frequency band that is different than the first and second frequency bands.

* * * * *